(12) United States Patent
Akhoury et al.

(10) Patent No.: US 11,496,897 B2
(45) Date of Patent: Nov. 8, 2022

(54) BIOMETRIC IDENTIFICATION OF INFORMATION RECIPIENTS

(71) Applicant: Citrix Systems, Inc., Fort Lauderdale, FL (US)

(72) Inventors: Arnav Akhoury, Bangalore (IN); Nandikotkur Achyuth, Bangalore (IN); Divyansh Deora, Bangalore (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 381 days.

(21) Appl. No.: 16/798,725

(22) Filed: Feb. 24, 2020

(65) Prior Publication Data

US 2021/0266738 A1 Aug. 26, 2021

(51) Int. Cl.
| | | |
|---|---|---|
| *H04W 12/06* | (2021.01) | |
| *H04W 12/08* | (2021.01) | |
| *H04W 12/69* | (2021.01) | |
| *G06V 40/16* | (2022.01) | |

(52) U.S. Cl.
CPC .......... *H04W 12/06* (2013.01); *G06V 40/166* (2022.01); *G06V 40/172* (2022.01); *H04W 12/08* (2013.01); *H04W 12/69* (2021.01)

(58) Field of Classification Search
CPC ..... H04W 12/06; H04W 12/08; H04W 12/69; G06V 40/166; G06V 40/172; G06V 10/95; H04L 63/0861
See application file for complete search history.

(56) References Cited

U.S. PATENT DOCUMENTS

| | | | |
|---|---|---|---|
| 2016/0065571 A1* | 3/2016 | Hoyos | H04L 63/0428 713/168 |
| 2017/0169435 A1* | 6/2017 | O'Regan | G06Q 20/3276 |
| 2017/0289235 A1* | 10/2017 | Mattox, Jr. | G06Q 10/10 |
| 2018/0337994 A1* | 11/2018 | Dachille | G06F 3/04842 |
| 2019/0347509 A1* | 11/2019 | Chiu | G06V 40/172 |

* cited by examiner

*Primary Examiner* — Baotran N To
(74) *Attorney, Agent, or Firm* — Pierce Atwood LLP

(57) ABSTRACT

A method may involve receiving, by a device operated by a user, at least one first input indicating that information is to be shared with at least one individual other than the user. The first device may acquire first biometric data from the at least one individual, and the information may be caused to be made accessible to at least one account that is associated with stored biometric data that matches the first biometric data.

20 Claims, 12 Drawing Sheets

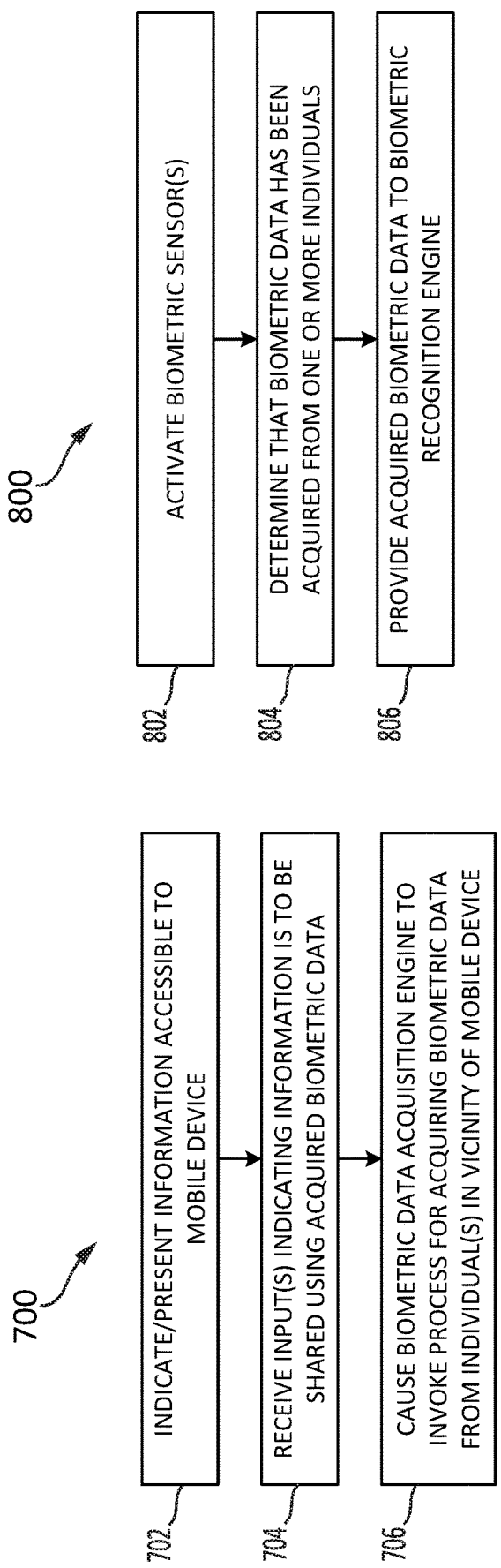

BIOMETRIC IDENTIFICATION OF INFORMATION RECIPIENTS

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method involves receiving, by a device operated by a user, at least one first input indicating that information is to be shared with at least one individual other than the user. The first device acquires first biometric data from the at least one individual, and the information is caused to be made accessible to at least one account that is associated with stored biometric data that matches the first biometric data.

In some embodiments, a method involves receiving, at a computing system and from a remote device operated by a user, an indication that information is to be shared with at least one individual other than the user. The computing system receives, from the remote device, first biometric data that was acquired from the at least one individual, and determines that the first biometric data matches stored biometric data that is associated with at least one account. The information is caused to be made accessible to the at least one account based at least in part on the first biometric data matching the stored biometric data.

In some embodiments, a system includes at least one processor and at least one computer-readable medium. The at least one computer-readable medium is encoded with instructions which, when executed by the at least one processor, cause the system to receive an indication that information is to be shared with at least one individual, to determine first biometric data that was acquired from the at least one individual, to determine that the first biometric data matches stored biometric data that is associated with at least one account, and to cause the information to be made accessible to the at least one account based at least in part on the first biometric data matching the stored biometric data.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 7 is a flow chart illustrate an example routine that may be executed by the file/information management engine shown in FIG. 6;

FIG. 8 is a flow chart illustrate an example routine that may be executed by the biometric data acquisition engine shown in FIG. 6;

DETAILED DESCRIPTION

Figure 1A:
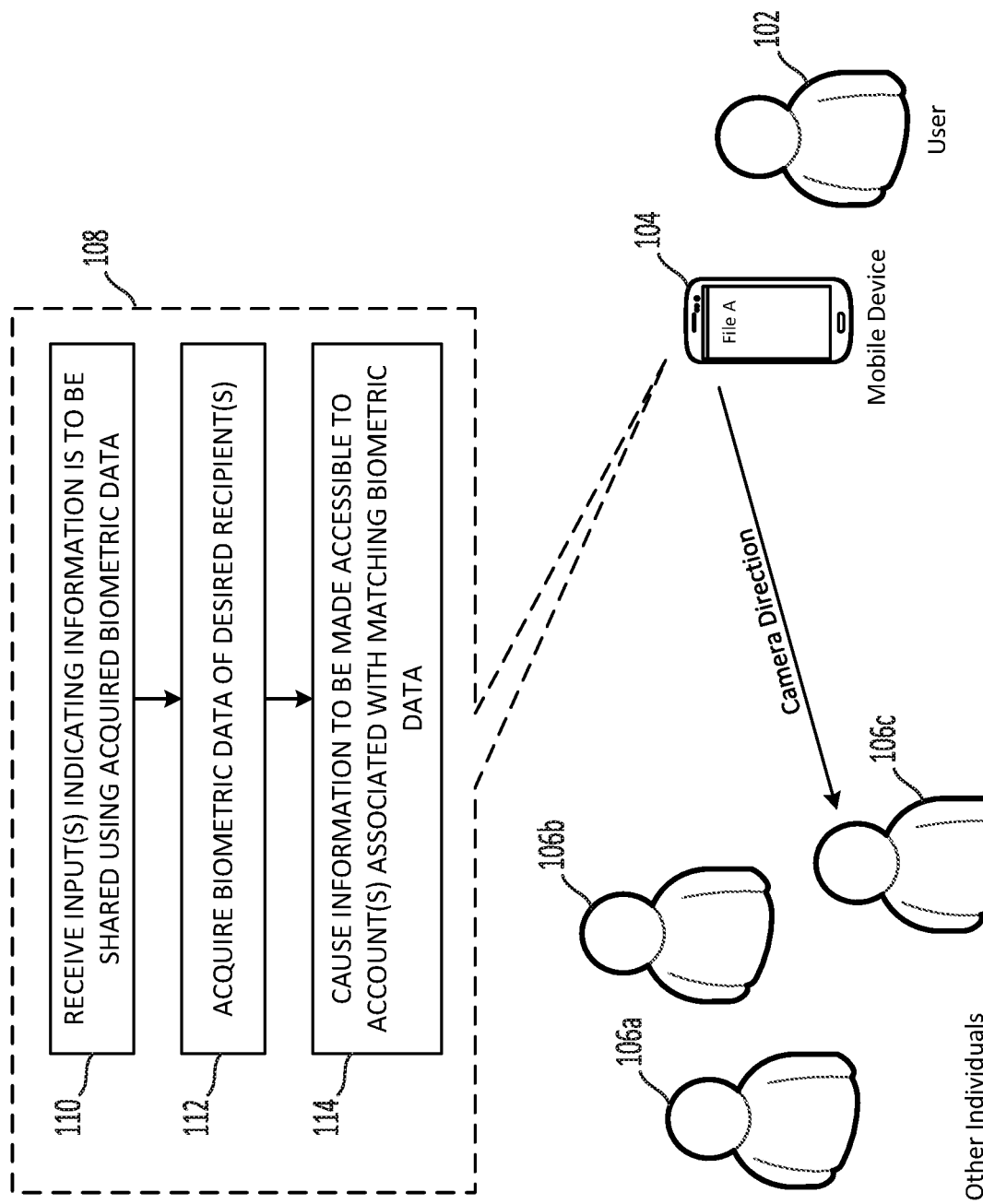
FIG. 1A illustrates a first example scenario in which biometric data may be used to identify recipient accounts for shared information.

For purposes of reading the description of the various embodiments below, the following descriptions of the sections of the specification and their respective contents may be helpful:

Section A provides an introduction to example embodiments of systems and methods for using biometric data to identify recipient accounts for shared information;

Section B describes a network environment which may be useful for practicing embodiments described herein;

Section C describes embodiments of systems and methods for delivering shared resources using a cloud computing environment;

Section D describes a computing system which may be useful for practicing embodiments described herein;

Section E describes example embodiments of systems for providing file sharing over networks;

Section F provides additional details concerning the systems and methods for using biometric data to identify recipient accounts for shared information that were introduced in Section A; and Section G describes example implementations of methods, systems/devices, and computer-readable media in accordance with the present disclosure.

A. Introduction to Illustrative Embodiments of Systems and Methods for Using Biometric Data to Identify Recipient Accounts for Shared Information Situations commonly arise in which users of mobile devices have a need to share one or more files or other information with one or more other individuals in their vicinity. For example, in a business setting, several employees may be participating in a team meeting in a conference room, and one of the employees may determine that it would be advantageous to share a file or other information that employee has access to with one or more of the other participants in the meeting. With existing systems, in addition to identifying the information to be shared, the employee would need to manually enter account identifiers (e.g., email addresses) for the desired recipient(s) into one or more fields for an application, e.g., Microsoft Outlook, Citrix Sharefile®, etc. While effective if done correctly, the inventors have recognized and appreciated that manually entering account identifiers for intended recipients can be both cumbersome and error prone.

Offered is a system in which intended recipients of to-be-transferred information may be identified simply by acquiring biometric data of the desired recipients. For example, in some embodiments, a camera, microphone, fingerprint scanner, etc., of a user's device may be used to quickly acquire biometric data from one or more individuals in the user's vicinity, and the acquired biometric data may then be used to determine account identifiers, e.g., email addresses, for such individuals. In some implementations, for example, a storage medium may contain facial images of various individuals and one or more account identifiers may be stored in association with the respective images. By comparing the acquired biometric data, e.g., camera images, with the stored biometric data, e.g., facial images of potential recipients, the identity of the individuals from whom the biometric data was acquired may be readily identified, e.g., by using facial recognition techniques. The account identifiers associated with the matching biometric data may then be used to share the information with the desired recipients.

In some implementations, a storage medium correlating biometric data with account identifiers may be located on the user's device and the user's device may itself compare received biometric data with stored biometric data of potential recipients to ascertain the account identifier(s) for the desired recipient(s). In other implementations, a storage medium may be remote from the user's device, e.g., as a part of a company's Active Directory (AD) or other system or service using the Lightweight Directory Access Protocol (LDAP) or the like, and a remote computing system may receive acquired biometric data from the user's device and determine the account identifier(s) that are associated with matching biometric data in the remote storage medium.

The information that is shared with the identified accounts may take on any of numerous forms and may be made accessible to the identified accounts in any of a number of ways. In some implementations, for example, the to-be-shared information may be stored on the mobile device in the form of a file, a drafted but not yet sent email, a highlighted section of displayed text, etc. In other implementations, the to-be-shared information may reside at a remote location, such within a file sharing system to which the user has access rights. In some implementations, the information may be made accessible to an identified account by sending it from the mobile device to an address, e.g., an email address, associated with the account. In other implementations, the information may be made accessible to an identified account by first uploading it from the mobile device to a file sharing system or other repository, and then either (1) providing the identified account with an access token or other credential(s) that may be used to access and/or download the uploaded information, or (2) causing the uploaded information to be automatically sent from the file sharing system or other repository to a repository for the identified account, e.g., as an attachment to an email. In still other implementations, where the to-be-shared information already resides within a file sharing system or other repository, the information may be made accessible to the identified account simply providing to the identified account with an access token or credential(s) that may be used to access and/or download the information, or else by causing the information to be automatically sent from the file sharing system or other repository to a repository for the identified account, e.g., as an attachment to an email.

FIG. 1A illustrates a first example scenario in which the foregoing approach for identifying recipient accounts for information sharing purposes may be useful. As shown, a user 102 may be operating a mobile device 104 in a vicinity of one or more other individuals 106*a*-*c*. The user 102 may have access to information ("File A" in the illustrated example) via the mobile device 104 and may wish to share that information with one or more of the other individuals 106. The to-be-shared information may be present on the mobile device 104 and/or located remotely (e.g., in a file sharing system) and may be indicated on the mobile device 104 using a file name, icon, or the like. Advantageously, the user 102 may identify accounts of the other individual(s) with which the information is to be shared simply by using the mobile device 104 to acquire biometric data from the desired recipient(s) of the information, e.g., by pointing a camera of the mobile device 104 toward one of more of the individuals 106 so as to capture an image that can be used by a facial recognition process to identify them. Account identifier(s) associated with the identified individual(s) (e.g., individual 106*c*) may then be used to share the information (e.g., File A) with such individual(s). The user 102 thus does not need to manually enter the correct account identifier, e.g., an email address, of each intended recipient.

FIG. 1A further illustrates an example routine 108 that may be performed by the mobile device 104 to share information using acquired biometric data. As shown, at a step 110 of the routine 108, the mobile device 104 may receive at least one input indicating that biometric data is to be used to identify one or more account(s) of individuals who are to receive shared information. Such input(s) may take on any of numerous forms and may be initiated and/or detected in any of a number of ways. As one illustrative example, the user 102 may navigate to and select a file name or icon representing a file (e.g., within a file folder structure), and may also take some action to indicate that biometric data is to be used to identify the account(s) of the intended recipient(s). The mobile device 104 may, for example, present the user 102 with a "share via image capture" option, either before or after a file or other information has been selected, or even during the file/information selection process, e.g., by allowing the user to select the file/information using a long-press or similar action which causes a list of options for sharing or otherwise processing the selected file/information to be presented for further selection. In some implementations, the user 102 may additionally or alternatively perform a particular gesture in conjunction with identifying a file or other information to indicate that biometric data is to be used to identify account(s) of the intended recipient(s) of the file/information. For example, in some implementations, the user 102 may select a file or other information, e.g., via a long-press action, and then swipe upward on a display screen of the mobile device 104 to indicate that the selected file/information is to be shared with accounts of one or more recipients who are identified based on an acquired image (or other biometric data). Other techniques for receiving the input(s) at the step 110 may additionally or alternatively be employed.

At a step 112, a biometric sensor (e.g., a camera, microphone, fingerprint scanner, etc.) may be used to acquire biometric data from one of more of the individuals 106. In some implementations, for example, the receipt of the one or more of the input(s) discussed above in connection with the step 110 may trigger operation a camera (or other biometric sensor) of the mobile device 104. As shown in FIG. 1A, when the biometric sensor is a camera, the user 102 may point the camera in a direction of a desired recipient (e.g., individual 106c) so as to capture an image that includes a representation of that recipient's face. In some implementations, a display screen of the mobile device 104 may display the image that is being acquired by the camera and may also include an overlay, e.g., a circle or a square, or other indicator at a particular location on the display, e.g., in the middle of the display. The user 102 may move the mobile device 104 until the desired recipient's face is positioned at a particular location with respect to the indicator. The user 102 may then indicate that the face of the desired recipient is positioned at the correct location on the screen, e.g., by pressing a "select" option or the like, by holding the mobile device 104 stationary such that the desired face remains a particular position with respect to the displayed indicator for a predetermined period of time, or otherwise. In some embodiments, the mobile device 104 may additionally or alternatively add indicators to the display screen at locations corresponding to portions of the image that are determined to represent faces, and the user may then indicate that one of more of the indicated faces should be used to determine corresponding accounts for information sharing purposes. The user 102 may, for example, tap on the displayed indicators for the faces of the imaged individuals with whom information is to be shared. In some implementations, the selected indicators may be altered, e.g., by changing from red to green, to indicate that they have been selected for information sharing purposes.

At a step 114, the mobile device 104 may cause the selected information to be made accessible to one or more accounts that are associated with stored biometric data that matches the acquired biometric data. In some embodiments, the step 114 may involve the mobile device 104 comparing the acquired biometric data with locally stored biometric data of other individuals (e.g., images associated with individuals in a contact list) and causing information to be shared with the accounts of one or more individuals for whom the acquired biometric data is found to match the stored biometric data with a sufficiently high degree of confidence. In other implementations, the step 114 may additionally or alternatively involve sending the acquired biometric data (optionally in in an encrypted form) to a remote computing system for comparison against biometric data of other individuals and identification of corresponding accounts. An example of such an implementation is described below in connection with FIG. 1B. As noted above, in some embodiments, biometric data (e.g., facial images) of large number individuals may be stored within or in conjunction with a company's Active Directory (AD) or other system or service using the Lightweight Directory Access Protocol (LDAP) or the like, which system or service may also correlate such images with account identifiers, e.g., email addresses, for information sharing purposes.

Although not illustrated in FIG. 1A, in some embodiments, the step 114 may further involve receiving a confirmation from the user 102 that the specified information is to be shared with one or more particular account custodians and/or accounts that have been identified as corresponding to the acquired biometric data. The mobile device 104 may, for example, present a list of custodians and/or accounts and present an option, e.g., a soft button or the like, for allowing the user to confirm the specified information is to be shared with the indicated custodians/accounts. In some implementation, the mobile device 104 may additionally or alternatively present a list of all account custodians who were identified using the acquired biometric data (e.g., the people whose faces were recognized in an acquired image), and may allow the user 102 to select one or more of such custodians with whom specified information is to be shared, e.g., via radio buttons associated with respective names on the display screen of the mobile device 104. In some implementations, such confirmation and/or recipient selection by the user 102 may be requested only when certain conditions are present. For example, in some embodiments, confirmation may be requested when a confidence level of facial or other biometric recognition for one or more individuals is below a threshold value. Further, in some implementations, confirmation and/or recipient selection may be requested when the acquired biometric data corresponds to multiple individuals, such as when multiple faces are recognized in an acquired image. Contextual data relating to the to-be-shared information and/or the circumstances in which the sharing request is being made may additionally or alternatively be taken into account when determining whether to request confirmation and/or selection of intended recipients from the user 102. For example, certain files may be associated with metadata designating them as "confidential" or the like and user confirmation and/or selection of intended recipients may be requested prior to sharing files that are so designated. Another example of contextual data that may be taken into account when determining whether to request user confirmation and/or selection of intended recipients is a location of the mobile device 104 at the time the biometric data is acquired at the step 112. Confirmation and/or recipient selection may be requested, for example, when the mobile device 104 is located remote from the user's ordinary workspace or is at a location that is known to be accessible to the general public. Whether user confirmation and/or selection of intended recipients is requested may additionally or alternatively depend on device and/or account settings put in place by the user 102, a network administrator (not illustrated), or otherwise.

Figure 1B:
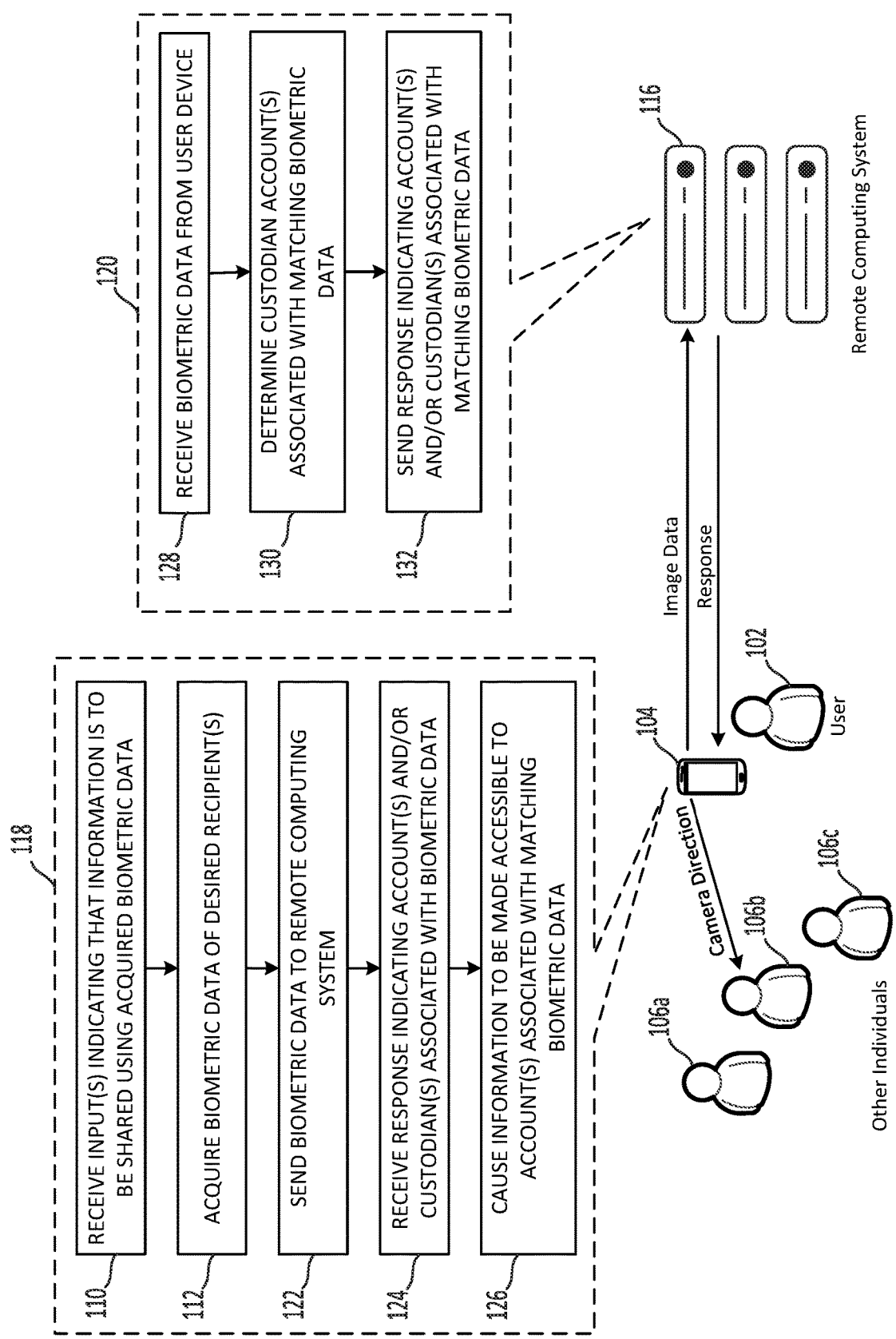
FIG. 1B illustrates a second example scenario in which biometric data may be used to identify recipient accounts for shared information.

FIG. 1B shows a second example scenario in which biometric data (e.g., facial images) acquired from one or more desired recipients (individual 106b in the illustrated example) is sent to a remote computing system 116 for processing to identify matching biometric data and associated account identifiers for individuals from whom the biometric data was acquired. As shown, in such a distributed processing environment, the mobile device 104 may perform a routine 118 and the remote computing system 116 may perform a routine 120. The steps 110 and 112 of the routine 118 may be the same or similar to the steps 110 and 112 of the routine 108 described above in connection with FIG. 1A. At a step 122 of the routine 118, the mobile device 104 may send the biometric data it acquired at the step 112 to the remote computing system 116 for processing. In some embodiments, the biometric data may be encrypted prior to being sent to the remote computing system 116.

As illustrated, at a step 128 of the routine 120, the remote computing system 116 may receive the biometric data (e.g., a camera image) acquired from one or more of the individuals 106 (individual 106b in the illustrated example). At a step 130 of the routine 120, the remote computing system 116 may compare the received biometric data with stored biometric data associated with respective account custodians to identify corresponding accounts of one or more custodians for whom the received biometric data is found to match the stored biometric data with a sufficiently high degree of confidence. At a step 132 of the routine 120, the remote computing system 116 may send a response to the mobile device 104 that indicates the identity one or more custodians associated with matching biometric data and/or account identifiers, e.g., email addresses, associated with the matching biometric data.

At a step 124 of the routine 118, the mobile device 104 may receive the response from the remote computing system 116. As noted above, in some implementations, such response may include one or more account identifiers, e.g., email addresses, that are associated with the individuals from whom the biometric data was acquired at the step 112. In such implementations, after receiving the response, the mobile device 104 may use the indicated account identifiers to cause selected information to be made accessible to the identified accounts, such as by sending the information to repositories for the identified account(s) or interacting with a file sharing system or other repository to enable the information to be accessed using such account(s), by using one of the techniques described above or otherwise.

As also noted above, in some implementations, the received response may include information identifying the account custodian(s) with whom the acquired biometric data was determined to correspond, and may prompt the mobile device 104 to request confirmation by the user 102 that the specified information is to be shared with the indicated custodian(s) and/or request that the user 102 select one or more identified custodians with whom the information is to be shared. Upon receiving such confirmation and/or recipient selection, the mobile device 104 may proceed to a step 126 of the routine 118, at which the mobile device 104 may cause the specified information to be made accessible to the account(s) for the identified individuals. In some implementations, one or more account identifiers may have been received from the remote computing system at the step 124, and the mobile device 104 may then use such account identifier(s) to cause the specified information to be made available to the indicated accounts, e.g., using one of the techniques described above or otherwise. In other implementations, the step 126 may involve sending a message back to the remote computing system 116 confirming that the information is to be shared with the specified custodians, and the remote computing system 116 may then look up and use corresponding account identifier(s) for the specified custodians and then take an action to cause the indicated information to be shared with the corresponding accounts.

As was the case with the routine 108 described above in connection with FIG. 1A, in some implementations, a confirmation that the correct account custodian(s) have been identified and/or a request to select one of more identified custodians with whom information is to be shared may be requested from the user 102 only when certain conditions are present. The same or similar criteria may be employed by the remote computing system 116 to determine whether to seek confirmation and/or recipient selection by the user 102 via the mobile device 104. In a circumstance in which such confirmation and/or recipient selection is not requested, the response sent at the step 132 of the routine 120 and received at the step 124 of the routine 118 may simply be a message confirming that the specified information has been shared with one or more particular custodians and/or accounts. In such a circumstance, the step 126 (in which the specified information is caused to be shared) may involve the same communication or series of communications as the step 122 (in which the acquired biometric data is sent to the remote computing system 116).

Additional details and example implementations of embodiments of the present disclosure are set forth below in Section F, following a description of example systems and network environments in which such embodiments may be deployed.

B. Network Environment

Figure 2:
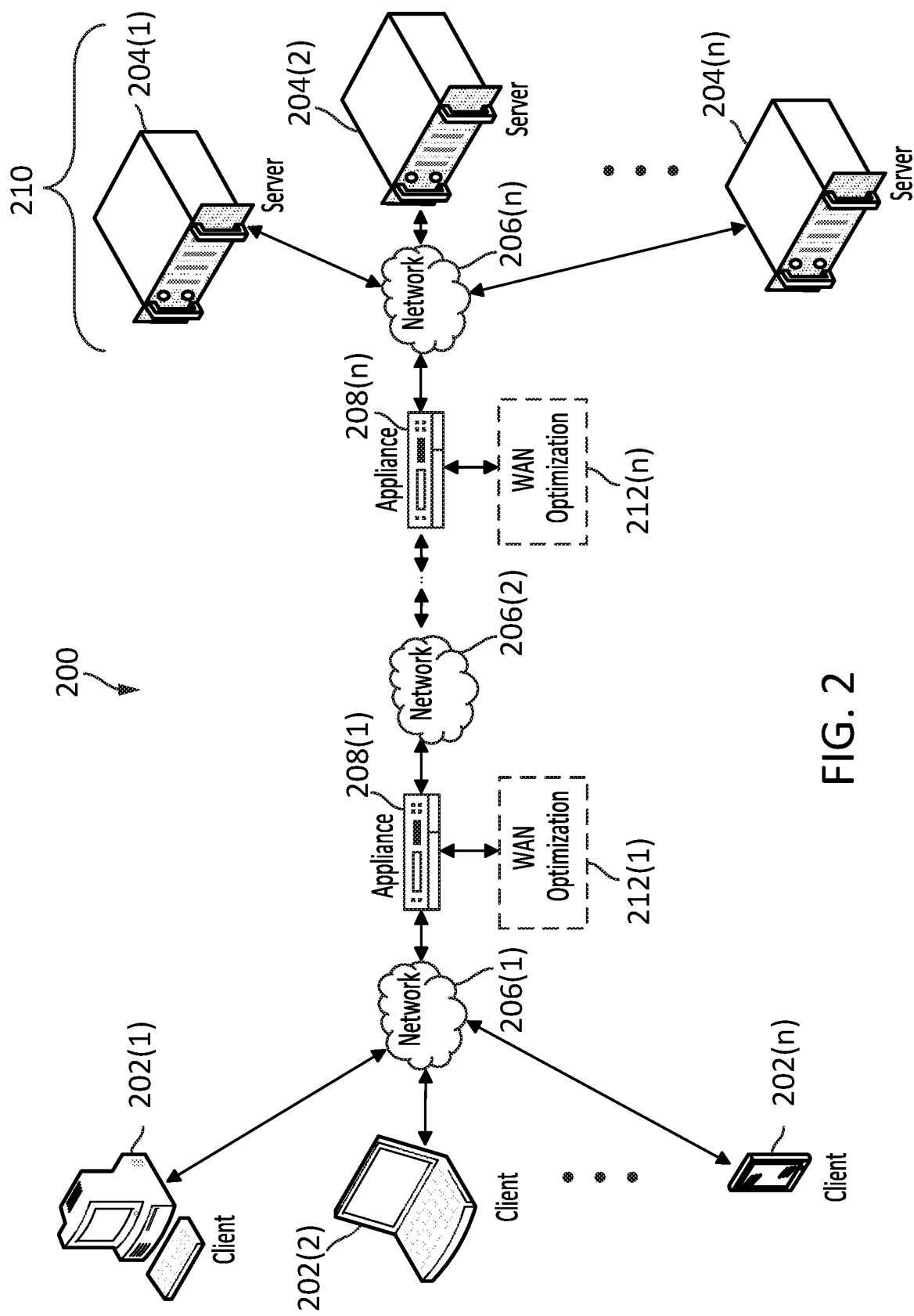
FIG. 2 is a diagram of a network environment in which some embodiments of the disclosed systems and methods for using biometric data to identify recipient accounts for shared information may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 204 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, for example, one or more of the appliances 212 may be implemented as products sold by Citrix Systems, Inc., of Fort Lauderdale, Fla., such as Citrix SD-WAN™ or Citrix Cloud™.

Figure 3:
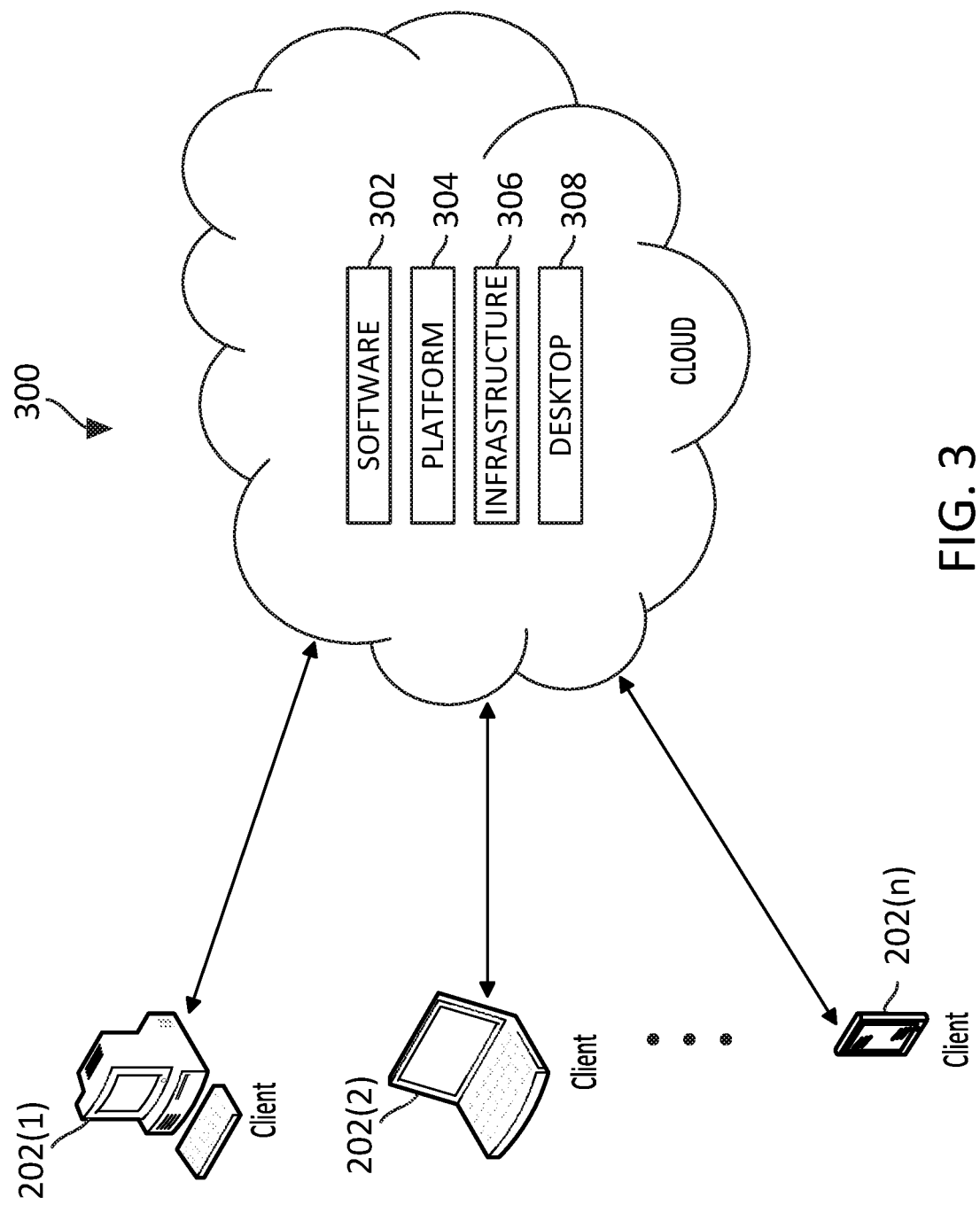
FIG. 3 is a schematic block diagram of a cloud computing environment in which various aspects of the disclosure may be implemented.

C. Systems and Methods for Delivering Shared Resources Using a Cloud Computing Environment Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 202 (such as those described in connection with FIG. 2) are in communication with a cloud network 304. The cloud network 304 may include back-end platforms, e.g., servers, storage, server farms and/or data centers. The clients 202 may correspond to a single organization/tenant or multiple organizations/tenants. More particularly, in one example implementation, the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 202 or the enterprise/tenant. The servers may be located off-site in remote geographical locations or otherwise.

The cloud computing environment 300 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 202. In some embodiments, the cloud computing environment 300 may include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 302, Platform as a Service (PaaS) 304, Infrastructure as a Service (IaaS) 306, and Desktop as a Service (DaaS) 308, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

D. Computing Environment

Figure 4:
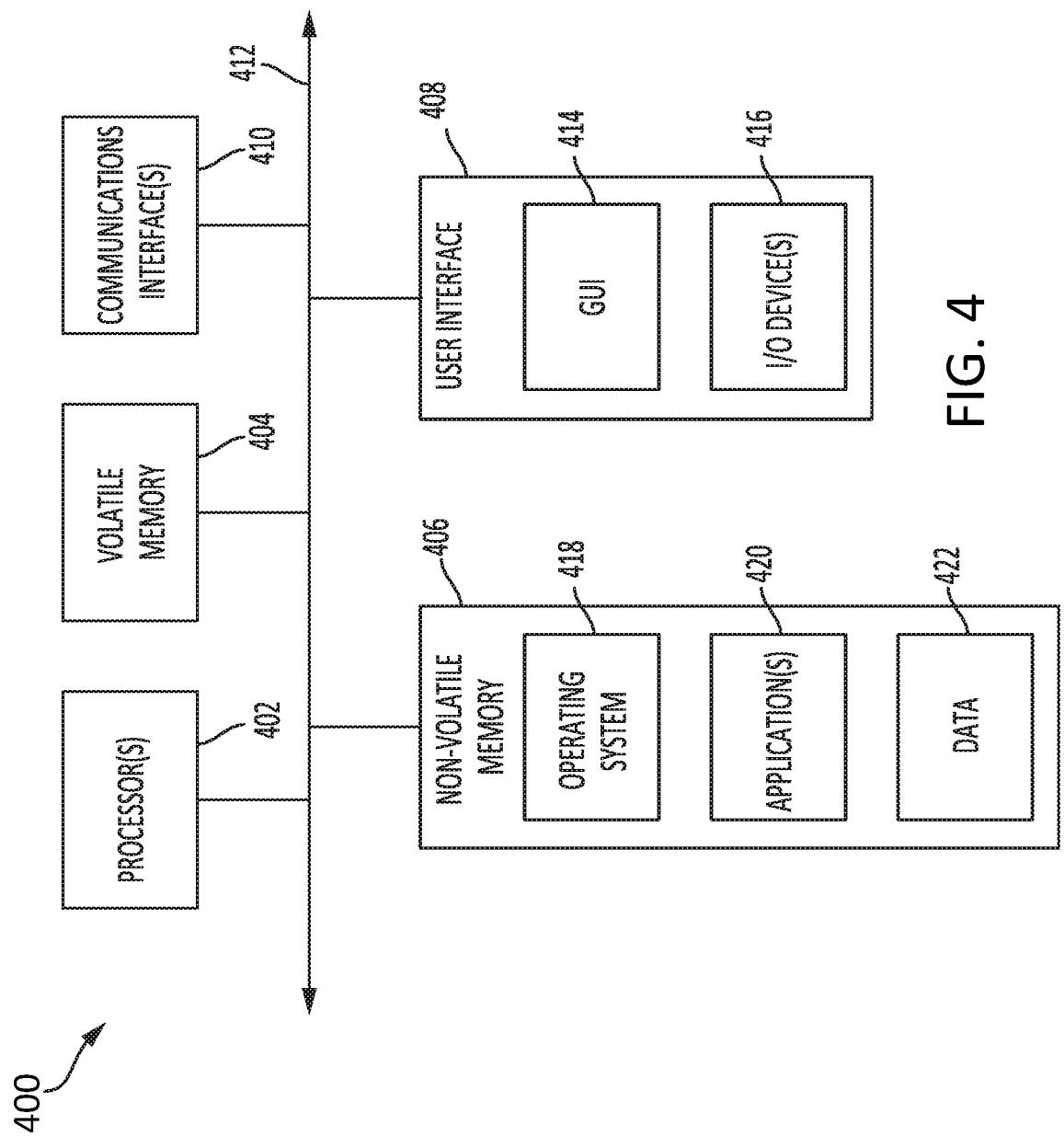
FIG. 4 is a block diagram of a computing system that may be used to implement one or more of the components of the computing environment shown in FIG. 2 in accordance with some embodiments.

FIG. 4 illustrates an example of a computing system 400 that may be used to implement one or more of the respective components (e.g., the clients 202, the servers 204, the appliances 208, 212) within the network environment 200 shown in FIG. 2. As shown in FIG. 4, the computing system 400 may include one or more processors 402, volatile memory 404 (e.g., RAM), non-volatile memory 406 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 408, one or more communications interfaces 410, and a communication bus 412. The user interface 408 may include a graphical user interface (GUI) 414 (e.g., a touchscreen, a display, etc.) and one or more input/output (I/O) devices 416 (e.g., a mouse, a keyboard, etc.). The non-volatile memory 406 may store an operating system 418, one or more applications 420, and data 422 such that, for example, computer instructions of the operating system 418 and/or applications 420 are executed by the processor(s) 402 out of the volatile memory 404. Data may be entered using an input device of the GUI 414 or received from I/O device(s) 416. Various elements of the computing system 400 may communicate via communication the bus 412. The computing system 400 as shown in FIG. 4 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 402 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 410 may include one or more interfaces to enable the computing system 400 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 400 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

E. Systems and Methods for Providing File Sharing Over Network(s)

Figure 5A:
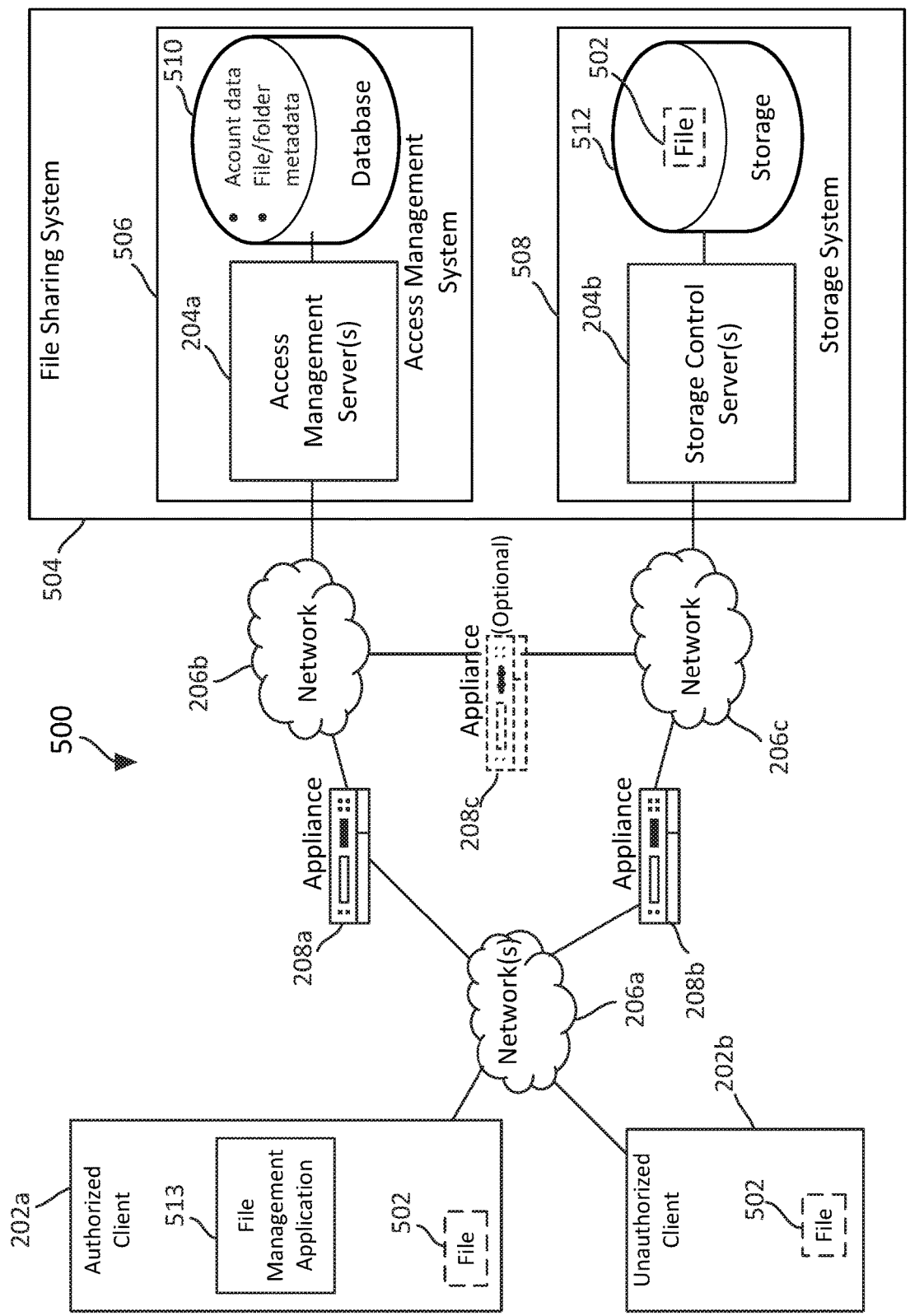
FIG. 5A is a diagram illustrating how a network computing environment like that shown in FIG. 2 may be configured to allow clients access to an example embodiment of a server-based file sharing system.

FIG. 5A shows an example network environment 500 for allowing an authorized client 202a and/or an unauthorized client 202b to upload a file 502 to a file sharing system 504 or download a file 502 from the file sharing system 504. The authorized client 202a may, for example, be a client 202 operated by a user having an active account with the file sharing system 504, while the unauthorized client 202b may be operated by a user who lacks such an account. As shown, in some embodiments, the authorized client 202a may include a file management application 513 with which a user of the authorized client 202a may access and/or manage the accessibility of one of more files 502 via the file sharing system 504. The file management application 513 may, for example, be a mobile or desktop application installed on the authorized client 202a (or in a computing environment accessible by the authorized client). The ShareFile® mobile app and the ShareFile® desktop app offered by Citrix Systems, Inc., of Fort Lauderdale, Fla., are examples of such preinstalled applications. In other embodiments, rather than being installed on the authorized client 202a, the file management application 513 may be executed by a web server (included with the file sharing system 504 or elsewhere) and provided to the authorized client 202a via one or more web pages.

As FIG. 5A illustrates, in some embodiments, the file sharing system 504 may include an access management system 506 and a storage system 508. As shown, the access management system 506 may include one or more access management servers 204a and a database 510, and the storage system 508 may include one or more storage control servers 204b and a storage medium 512. In some embodiments, the access management server(s) 204a may, for example, allow a user of the file management application 513 to log in to his or her account, e.g., by entering a user name and password corresponding to account data stored in the database 510. Once the user of the client 202a has logged in, the access management server 204a may enable the user to view (via the authorized client 202a) information identifying various folders represented in the storage medium 512, which is managed by the storage control server(s) 204b, as well as any files 502 contained within such folders. File/folder metadata stored in the database 510 may be used to identify the files 502 and folders in the storage medium 512 to which a particular user has been provided access rights.

In some embodiments, the clients 202a, 202b may be connected to one or more networks 206a (which may include the Internet), the access management server(s) 204a may include webservers, and an appliance 208a may load balance requests from the authorized client 202a to such webservers. The database 510 associated with the access management server(s) 204a may, for example, include information used to process user requests, such as user account data (e.g., username, password, access rights, security questions and answers, etc.), file and folder metadata (e.g., name, description, storage location, access rights, source IP address, etc.), and logs, among other things. Although the clients 202a, 202b are shown is FIG. 5A as stand-alone computers, it should be appreciated that one or both of the clients 202a, 202b shown in FIG. 5A may instead represent other types of computing devices or systems that can be operated by users. In some embodiments, for example, one or both of the authorized client 202a and the unauthorized client 202b may be implemented as a server-based virtual computing environment that can be remotely accessed using a separate computing device operated by users, such as described above.

In some embodiments, the access management system 506 may be logically separated from the storage system 508, such that files 502 and other data that are transferred between clients 202 and the storage system 508 do not pass through the access management system 506. Similar to the access management server(s) 204a, one or more appliances 208b may load-balance requests from the clients 202a, 202b received from the network(s) 206a (which may include the Internet) to the storage control server(s) 204b. In some embodiments, the storage control server(s) 204b and/or the storage medium 512 may be hosted by a cloud-based service provider (e.g., Amazon Web Services™ or Microsoft Azure™). In other embodiments, the storage control server(s) 204b and/or the storage medium 512 may be located at a data center managed by an enterprise of a client 202, or may be distributed among some combination of a cloud-based system and an enterprise system, or elsewhere.

After a user of the authorized client 202a has properly logged in to an access management server 204a, the server 204a may receive a request from the client 202a for access to one of the files 502 or folders to which the logged in user has access rights. The request may either be for the authorized client 202a to itself to obtain access to a file 502 or folder or to provide such access to the unauthorized client 202b. In some embodiments, in response to receiving an access request from an authorized client 202a, the access management server 204a may communicate with the storage control server(s) 204b (e.g., either over the Internet via appliances 208a and 208b or via an appliance 208c positioned between networks 206b and 206c) to obtain a token generated by the storage control server 204b that can subsequently be used to access the identified file 502 or folder.

In some implementations, the generated token may, for example, be sent to the authorized client 202a, and the authorized client 202a may then send a request for a file 502, including the token, to the storage control server(s) 202b. In other implementations, the authorized client 202a may send the generated token to the unauthorized client 202b so as to allow the unauthorized client 202b to send a request for the file 502, including the token, to the storage control server(s) 204b. In yet other implementations, an access management server 204a may, at the direction of the authorized client 202a, send the generated token directly to the unauthorized client 202b so as to allow the unauthorized client 202b to send a request for the file 502, including the token, to the storage control server(s) 204b. In any of the forgoing scenarios, the request sent to the storage control server(s) 204b may, in some embodiments, include a uniform resource locator (URL) that resolves to an internet protocol (IP) address of the storage control server(s) 204b, and the token may be appended to or otherwise accompany the URL. Accordingly, providing access to one or more clients 202 may be accomplished, for example, by causing the authorized client 202a to send a request to the URL address, or by sending an email, text message or other communication including the token-containing URL to the unauthorized client 202b, either directly from the access management server(s) 204a or indirectly from the access management server(s) 204a to the authorized client 202a and then from the authorized client 202a to the unauthorized client 202b. In some embodiments, selecting the URL or a user interface element corresponding to the URL, may cause a request to be sent to the storage control server(s) 204b that either causes a file 502 to be downloaded immediately to the client that sent the request, or may cause the storage control server 204b to return a webpage to the client that includes a link or other user interface element that can be selected to effect the download.

In some embodiments, a generated token can be used in a similar manner to allow either an authorized client 202a or an unauthorized client 202b to upload a file 502 to a folder corresponding to the token. In some embodiments, for example, an "upload" token can be generated as discussed above when an authorized client 202a is logged in and a designated folder is selected for uploading. Such a selection may, for example, cause a request to be sent to the access management server(s) 204a, and a webpage may be returned, along with the generated token, that permits the user to drag and drop one or more files 502 into a designated region and then select a user interface element to effect the upload. The resulting communication to the storage control server(s) 204b may include both the to-be-uploaded file(s) 502 and the pertinent token. On receipt of the communication, a storage control server 204b may cause the file(s) 502 to be stored in a folder corresponding to the token.

In some embodiments, sending a request including such a token to the storage control server(s) 204b (e.g., by selecting a URL or user-interface element included in an email inviting the user to upload one or more files 502 to the file sharing system 504), a webpage may be returned that permits the user to drag and drop one or more files 502 into a designated region and then select a user interface element to effect the upload. The resulting communication to the storage control server(s) 204b may include both the to-be-uploaded file(s) 502 and the pertinent token. On receipt of the communication, a storage control server 204b may cause the file(s) 502 to be stored in a folder corresponding to the token.

In the described embodiments, the clients 202, servers 204, and appliances 208 and/or 212 (appliances 212 are shown in FIG. 2) may be deployed as and/or executed on any type and form of computing device, such as any desktop computer, laptop computer, rack-mounted computer, or mobile device capable of communication over at least one network and performing the operations described herein. For example, the clients 202, servers 204 and/or appliances 208 and/or 212 may correspond to respective computing systems, groups of computing systems, or networks of distributed computing systems, such as computing system 400 shown in FIG. 4.

Figure 5B:
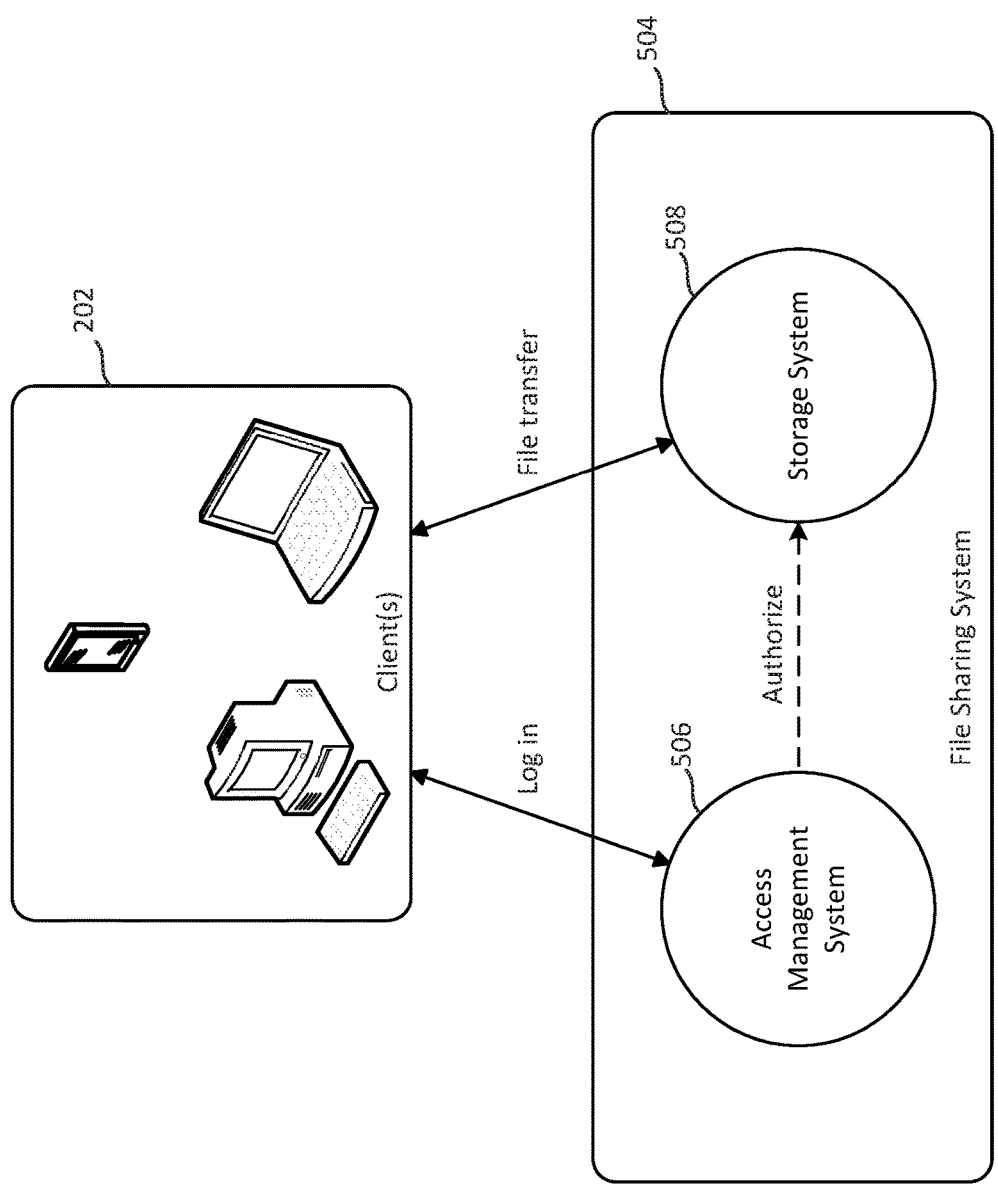
FIG. 5B is a diagram illustrating certain operations that may be performed by the file sharing system shown in FIG. 5A in accordance with some embodiments.

As discussed above in connection with FIG. 5A, in some embodiments, a file sharing system may be distributed between two sub-systems, with one subsystem (e.g., the access management system 506) being responsible for controlling access to files 502 stored in the other subsystem (e.g., the storage system 508). FIG. 5B illustrates conceptually how one or more clients 202 may interact with two such subsystems.

As shown in FIG. 5B, an authorized user operating a client 202, which may take on any of numerous forms, may log in to the access management system 506, for example, by entering a valid user name and password. In some embodiments, the access management system 506 may include one or more webservers that respond to requests from the client 202. The access management system 506 may store metadata concerning the identity and arrangements of files 502 (shown in FIG. 5A) stored by the storage system 508, such as folders maintained by the storage system 508 and any files 502 contained within such folders. In some embodiments, the metadata may also include permission metadata identifying the folders and files 502 that respective users are allowed to access. Once logged in, a user may employ a user-interface mechanism of the client 202 to navigate among folders for which the metadata indicates the user has access permission.

In some embodiments, the logged-in user may select a particular file 502 the user wants to access and/or to which the logged-in user wants a different user of a different client 202 to be able to access. Upon receiving such a selection from a client 202, the access management system 506 may take steps to authorize access to the selected file 502 by the logged-in client 202 and/or the different client 202. In some embodiments, for example, the access management system 506 may interact with the storage system 508 to obtain a unique "download" token which may subsequently be used by a client 202 to retrieve the identified file 502 from the storage system 508. The access management system 506 may, for example, send the download token to the logged-in client 202 and/or a client 202 operated by a different user. In some embodiments, the download token may a single-use token that expires after its first use.

In some embodiments, the storage system 508 may also include one or more webservers and may respond to requests from clients 202. In such embodiments, one or more files 502 may be transferred from the storage system 508 to a client 202 in response to a request that includes the download token. In some embodiments, for example, the download token may be appended to a URL that resolves to an IP address of the webserver(s) of the storage system 508. Access to a given file 502 may thus, for example, be enabled by a "download link" that includes the URL/token. Such a download link may, for example, be sent the logged-in client 202 in the form of a "DOWNLOAD" button or other user-interface element the user can select to effect the transfer of the file 502 from the storage system 508 to the client 202. Alternatively, the download link may be sent to a different client 202 operated by an individual with which the logged-in user desires to share the file 502. For example, in some embodiments, the access management system 506 may send an email or other message to the different client 202 that includes the download link in the form of a "DOWNLOAD" button or other user-interface element, or simply with a message indicating "Click Here to Download" or the like. In yet other embodiments, the logged-in client 202 may receive the download link from the access management system 506 and cut-and-paste or otherwise copy the download link into an email or other message the logged in user can then send to the other client 202 to enable the other client 202 to retrieve the file 502 from the storage system 508.

In some embodiments, a logged-in user may select a folder on the file sharing system to which the user wants to transfer one or more files 502 (shown in FIG. 5A) from the logged-in client 202, or to which the logged-in user wants to allow a different user of a different client 202 to transfer one or more files 502. Additionally or alternatively, the logged-in user may identify one or more different users (e.g., by entering their email addresses) the logged-in user wants to be able to access one or more files 502 currently accessible to the logged-in client 202.

Similar to the file downloading process described above, upon receiving such a selection from a client 202, the access management system 506 may take steps to authorize access to the selected folder by the logged-in client 202 and/or the different client 202. In some embodiments, for example, the access management system 506 may interact with the storage system 508 to obtain a unique "upload token" which may subsequently be used by a client 202 to transfer one or more files 502 from the client 202 to the storage system 508. The access management system 506 may, for example, send the upload token to the logged-in client 202 and/or a client 202 operated by a different user.

One or more files 502 may be transferred from a client 202 to the storage system 508 in response to a request that includes the upload token. In some embodiments, for example, the upload token may be appended to a URL that resolves to an IP address of the webserver(s) of the storage system 508. For example, in some embodiments, in response to a logged-in user selecting a folder to which the user desires to transfer one or more files 502 and/or identifying one or more intended recipients of such files 502, the access management system 506 may return a webpage requesting that the user drag-and-drop or otherwise identify the file(s) 502 the user desires to transfer to the selected folder and/or a designated recipient. The returned webpage may also include an "upload link," e.g., in the form of an "UPLOAD" button or other user-interface element that the user can select to effect the transfer of the file(s) 502 from the client 202 to the storage system 508.

In some embodiments, in response to a logged-in user selecting a folder to which the user wants to enable a different client 202 operated by a different user to transfer one or more files 502, the access management system 506 may generate an upload link that may be sent to the different client 202. For example, in some embodiments, the access management system 506 may send an email or other message to the different client 202 that includes a message indicating that the different user has been authorized to transfer one or more files 502 to the file sharing system, and inviting the user to select the upload link to effect such a transfer. Section of the upload link by the different user may, for example, generate a request to webserver(s) in the storage system and cause a webserver to return a webpage inviting the different user to drag-and-drop or otherwise identify the file(s) 502 the different user wishes to upload to the file sharing system 504. The returned webpage may also include a user-interface element, e.g., in the form of an "UPLOAD" button, that the different user can select to effect the transfer of the file(s) 502 from the client 202 to the storage system 508. In other embodiments, the logged-in user may receive the upload link from the access management system 506 and may cut-and-paste or otherwise copy the upload link into an email or other message the logged-in user can then send to the different client 202 to enable the different client to upload one or more files 502 to the storage system 508.

In some embodiments, in response to one or more files 502 being uploaded to a folder, the storage system 508 may send a message to the access management system 506 indicating that the file(s) 502 have been successfully uploaded, and an access management system 506 may, in turn, send an email or other message to one or more users indicating the same. For user's that have accounts with the file sharing system 504, for example, a message may be sent to the account holder that includes a download link that the account holder can select to effect the transfer of the file 502 from the storage system 508 to the client 202 operated by the account holder. Alternatively, the message to the account holder may include a link to a webpage from the access management system 506 inviting the account holder to log in to retrieve the transferred files 502. Likewise, in circumstances in which a logged-in user identifies one or more intended recipients for one or more to-be-uploaded files 502 (e.g., by entering their email addresses), the access management system 506 may send a message including a download link to the designated recipients (e.g., in the manner described above), which such designated recipients can then use to effect the transfer of the file(s) 502 from the storage system 508 to the client(s) 202 operated by those designated recipients.

Figure 5C:
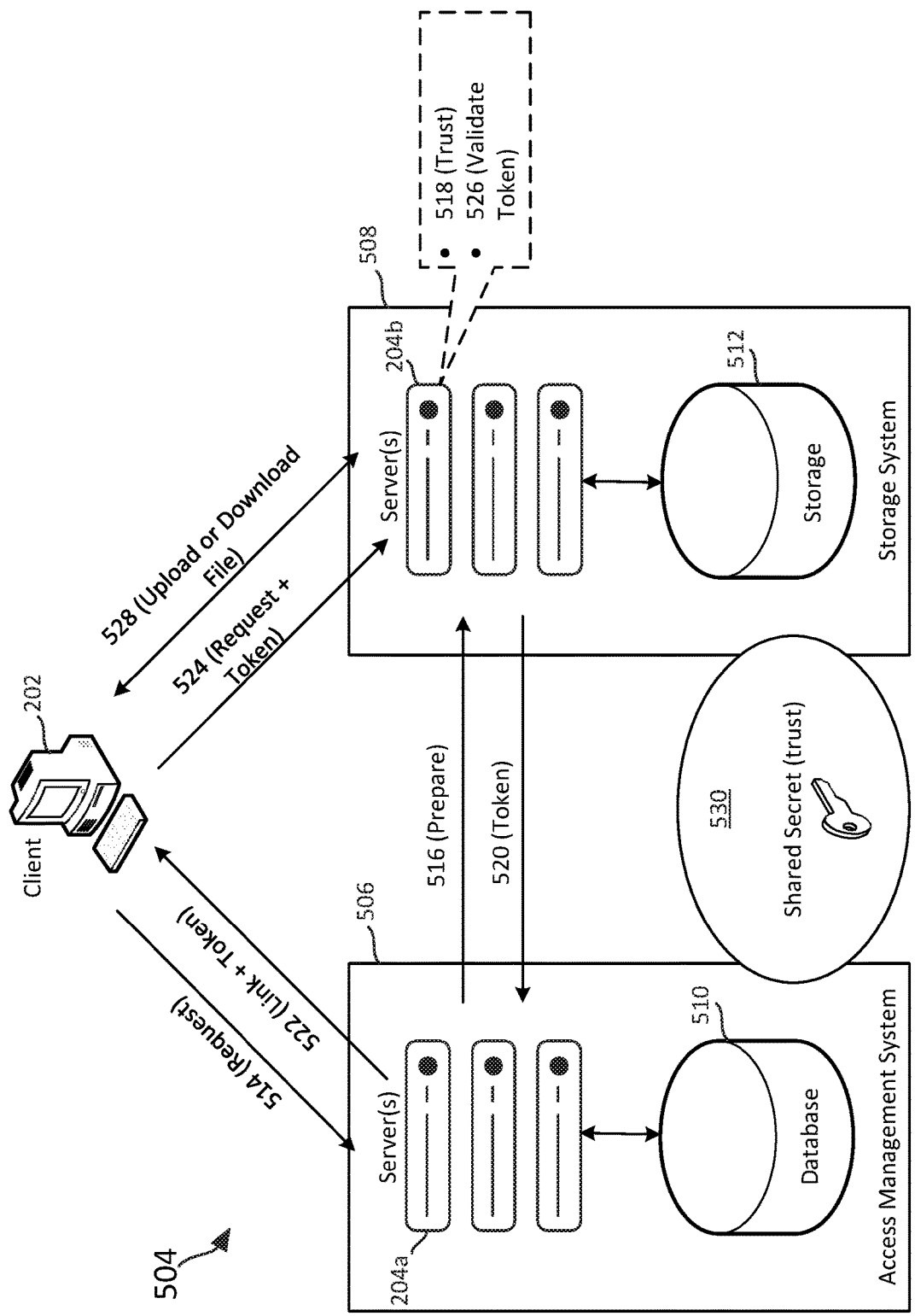
FIG. 5C is a diagram illustrating additional operations that may be performed by the file sharing system shown in FIG. 5A in accordance with some embodiments.

FIG. 5C is a block diagram showing an example of a process for generating access tokens (e.g., the upload tokens and download tokens discussed above) within the file sharing system 504 described in connection with FIGS. 5A and 5B.

As shown, in some embodiments, a logged-in client 202 may initiate the access token generation process by sending an access request 514 to the access management server(s) 204b. As noted above, the access request 514 may, for example, correspond to one or more of (A) a request to enable the downloading of one or more files 502 (shown in FIG. 5A) from the storage system 508 to the logged-in client 202, (B) a request to enable the downloading of one or more files 502 from the storage system 508 to a different client 202 operated by a different user, (C) a request to enable the uploading of one or more files 502 from a logged-in client 202 to a folder on the storage system 508, (D) a request to enable the uploading of one or more files 502 from a different client 202 operated by a different user to a folder of the storage system 508, (E) a request to enable the transfer of one or more files 502, via the storage system 508, from a logged-in client 202 to a different client 202 operated by a different user, or (F) a request to enable the transfer of one or more files 502, via the storage system 508, from a different client 202 operated by a different user to a logged-in client 202.

In response to receiving the access request 514, an access management server 204a may send a "prepare" message 516 to the storage control server(s) 204b of the storage system 508, identifying the type of action indicated in the request, as well as the identity and/or location within the storage medium 512 of any applicable folders and/or files 502. As shown, in some embodiments, a trust relationship may be established (step 518) between the storage control server(s) 204b and the access management server(s) 204a. In some embodiments, for example, the storage control server(s) 204b may establish the trust relationship by validating a hash-based message authentication code (HMAC) based on shared secret or key 530).

After the trust relationship has been established, the storage control server(s) 204b may generate and send (step 520) to the access management server(s) 204a a unique upload token and/or a unique download token, such as those as discussed above.

After the access management server(s) 204a receive a token from the storage control server(s) 204b, the access management server(s) 204a may prepare and send a link 522 including the token to one or more client(s) 202. In some embodiments, for example, the link may contain a fully qualified domain name (FQDN) of the storage control server(s) 204b, together with the token. As discussed above, the link 522 may be sent to the logged-in client 202 and/or to a different client 202 operated by a different user, depending on the operation that was indicated by the request.

The client(s) 202 that receive the token may thereafter send a request 524 (which includes the token) to the storage control server(s) 204b. In response to receiving the request, the storage control server(s) 204b may validate (step 526) the token and, if the validation is successful, the storage control server(s) 204b may interact with the client(s) 202 to effect the transfer (step 528) of the pertinent file(s) 502, as discussed above.

F. Detailed Description of Example Embodiments of Systems and Methods for Using Biometric Data to Identify Recipient Accounts for Shared Information As discussed above in connection with FIGS. 1A and 1B, embodiments of the present disclosure allow a user 102 of a mobile device 104 to identify one or more accounts with which a file or other information is to be shared simply by acquiring biometric data (e.g., a camera image, audio data, fingerprint data, etc.) from one or more individuals in the vicinity of the mobile device 104. As also noted above, suitable recipient account identification techniques may be performed by the mobile device 104 alone, or by the mobile device in conjunction with a remote computing system 116. In some embodiments, the mobile device 104 described in Section A may be implemented using any of the clients 202 described in Sections B through E. The remote computing system 116 described in Section A may likewise be implemented using any of the server(s) 204 or server-based computing systems described in those same sections.

Figure 6:
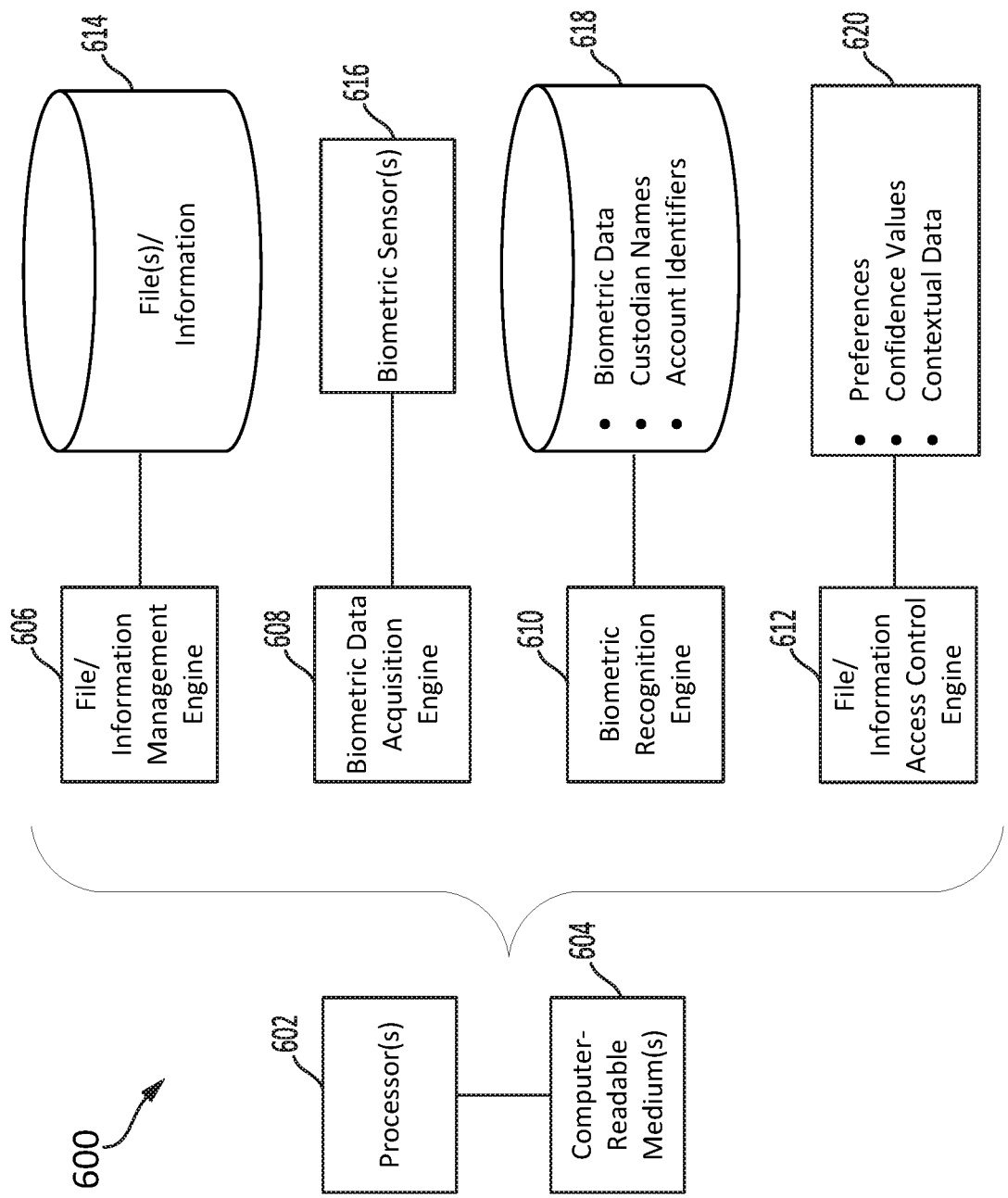
FIG. 6 is a block diagram illustrating functional components of an information sharing system configured in accordance with some embodiments of the present disclosure.

FIG. 6 illustrates example components of an information sharing system 600 that may be used to implement the functionality introduced above in Section A. As shown in FIG. 6, in some embodiments, the information sharing system 600 may include one or more processors 602 and one or more computer readable media 604 that together may implement a number of functional modules, including a file/information management engine 606, a biometric data acquisition engine 608, a biometric recognition engine 610, and a file/information access control engine 612. In some implementations, the processor(s) 602 and computer-readable medium(s) 604 may all be included in the mobile device 104. In other implementations, two or more processors 602 and two or more computer-readable mediums 604 may be distributed between the mobile device 104 and the remote computing system 116 to implement the noted functionality. As FIG. 6 also illustrates, in some embodiments, the information sharing system 600 may additionally include a repository 614 for storing files or other information to be shared, one or more biometric sensors 616 for acquiring biometric data from individuals with whom information is to be shared, and a repository 618 for storing biometric data in association with account identifiers, e.g., email addresses, and/or user names, for respective individuals. As illustrated, in some implementations, the file/information access control engine 612 may receive and/or have access to a variety of data 620 (described below) that it may use to determine the circumstances in which the user 102 is to confirm that information is to be shared with one or more identified account custodians and/or to indicate one or more identified custodians with whom information is to be shared, as discussed above.

In some embodiments, the file/information management engine 606 may control access to files or other information stored in the repository 614, and may also detect one or more inputs by a user indicating a desire to share such files/information with one or more individuals using biometric data acquired from those individuals. An example routine 700 that may be executed by the file/information management engine 606 for such purposes is shown in FIG. 7. As shown in FIG. 7, at a step 702, the file/information management engine 606 may indicate or present to the user 102 (e.g., via a display screen of the mobile device 104) some information that is accessible by the mobile device 104 and that is capable of being shared. As noted above, such "sharable" information may include a file or any other information, such as a block of text, a drafted but not yet sent email, etc., that can be selected for sharing. In some embodiments, the repository 614 (shown in FIG. 6) may be included within or co-located with the mobile device 104, and the file/information management engine 606 may correspond to a file access system on the mobile device 104 that allows the user 102 to navigate amongst and access one or more files in the repository 614. In other implementations, the repository 614 may correspond to memory of the mobile device 104 in which information can be stored and selected for sharing, and the file/information management engine 606 may correspond to a module that allows such information to be identified for sharing. For example, the file/information management engine 606 may allow the user to highlight a section of text in a displayed document or "snip" a region of a display screen and indicate that the selected text/screen is to be shared, may allow a user to draft an email and indicate that the email is to be shared, etc.

In some embodiments, the file/information management engine 606 may additionally or alternatively be embodied by or operate in conjunction with components of a file sharing system, such as the file sharing system 504 and associated file management application 513 described above in connection with FIGS. 5A-C. In such embodiments, the repository 614 may correspond the storage medium 512 of the file sharing system 504 in which a to-be-shared filed 502 resides and/or memory of an authorized client 202a in which a to-be-shared file 502 is stored. As described above in connection with FIGS. 5A-C, a file management application 513 may allow a user of an authorized client 202a (e.g., the user 102 of the mobile device 104) to access and/or manage the accessibility of one of more files 502 via the file sharing system 504. Such a file management application 513 may, for example, be a mobile or desktop application installed on the mobile device 104 (or in a computing environment accessible by the authorized client). The ShareFile® mobile app and the ShareFile® desktop app offered by Citrix Systems, Inc., of Fort Lauderdale, Fla., are examples of such preinstalled applications. In other implementations, rather than being installed on the mobile device 104, such a file management application 513 may be executed by a web server (included with the file sharing system 504 or elsewhere) and provided to the mobile device via one or more web pages.

No matter how it is implemented, the file/information management engine 606 may, per a step 704 of the routine 700, include at least one component that allows the user 102 to provide at least one input to the mobile device 104 indicating that biometric data is to be used to identify one or more account(s) of individuals who are to receive shared information. Examples of possible inputs that may be received by the mobile device 104 and recognized by the file/information management engine 606 are described above in connection with the step 110 of the routines 108 and 118 shown in FIGS. 1A and 1B. In some embodiments, the file management application 513 or another module on the mobile device 104 may be configured to recognize such input(s).

Upon recognizing input(s) indicating that biometric data is to be used to identify one or more account(s) of individuals who are to receive shared information, the file/information management engine 606 may, per a step 706 of the routine 700, instruct or otherwise cause the biometric data acquisition engine 608 to invoke a process for using the biometric sensor(s) 616 to acquire biometric data from one or more individuals in the vicinity of the mobile device 104. As discussed above, the biometric sensor(s) 616 may include one or more components of the mobile device 104 that are capable of acquiring such biometric data. Examples of suitable biometric sensors include a camera, a microphone, and a fingerprint scanner. At least a portion of the biometric data acquisition engine 608 may be located on the mobile device 104 so as to control operation of the biometric sensor(s) 616. Examples of processes that may be used to acquire such biometric data are described above in connection with the step 112 of the routines 108 and 118 shown in FIGS. 1A and 1B.

After the biometric data acquisition engine 608 has acquired biometric data (via the biometric sensor(s) 616), it may pass the acquired biometric data to the biometric recognition engine 610 for processing. An example routine 800 that may be executed by the biometric data acquisition engine 608 is shown in FIG. 8. As shown in FIG. 8, at a step 802 of the routine 800, the biometric data acquisition engine 608 may activate one or more of the biometric sensors 616 to allow the acquisition of biometric data from one or more of the individuals 106 in a vicinity of the mobile device 104. At a step 804 of the routine 800, the biometric data acquisition engine 608 may determine that biometric data has been successfully acquired from one or more of the individuals 106. Examples of biometric sensors 616 that may be employed and techniques for acquiring suitable data using such sensors are described above in connection with the step 112 of the routines 108 and 118 shown in FIGS. 1A-B. At a step 806, the biometric data acquisition engine 608 may provide the acquired biometric data to the biometric recognition engine 610 for processing.

Figure 9:
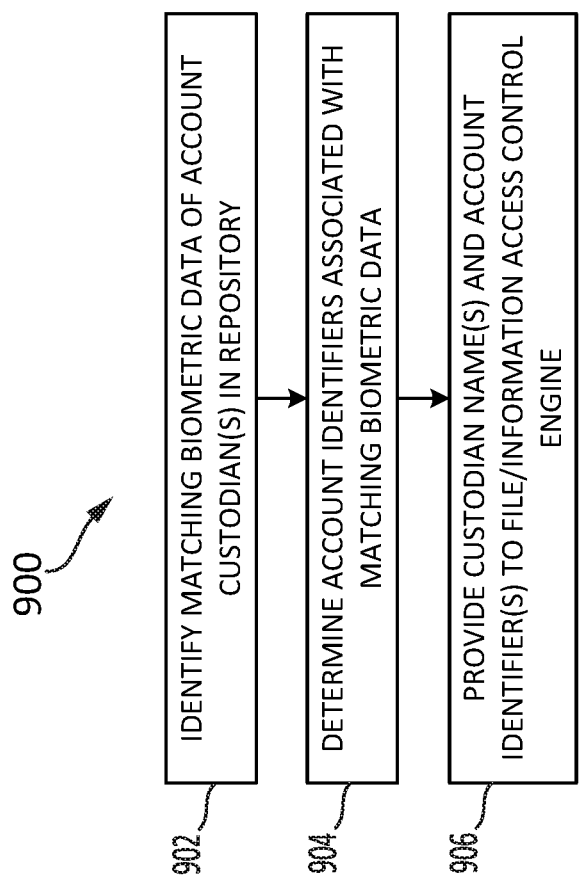
FIG. 9 is a flow chart illustrate an example routine that may be executed by the biometric recognition engine shown in FIG. 6.

An example routine 900 that may be executed by the biometric recognition engine 610 is shown in FIG. 9. At a step 902 of the routine 900, the biometric recognition engine 610 may evaluate the biometric data received from the biometric data acquisition engine 608 against biometric data for one or more account custodians 106 that is stored in the repository 618, and identify any stored biometric data that is found to match the acquired biometric data with a sufficient degree of confidence. In some implementations, the biometric recognition engine 610 may operate in whole or in part on the mobile device 104. In other implementations, the biometric recognition engine 610 may operate in whole or in part within the remote computing system 116 (shown in FIG. 1B). In still other implementations, the biometric recognition engine 610 may be distributed between the mobile device 104 and the remote computing system 116. In some embodiments, for example, the biometric recognition engine 610 may be included within or operate in conjunction with the file sharing system 504 described above in connection with FIGS. 5A-C. In some implementations, the biometric recognition engine 610 may additionally or alternatively employ a third-party service to store a collection of biometric data (e.g., facial images) associated with respective individuals, and compare the acquired biometric data against such a collection to ascertain the identify of such individuals. As shown in FIG. 6, previously acquired biometric data for respective account custodians may be stored in the repository 618 and may be associated, either directly or indirectly, with account identifiers, e.g., email addresses for one or more accounts with which information may be shared. In some implementations, the repository 618 may be located, in whole or in part, on the mobile device 104. In other implementations, the repository 618 may be located, in whole or in part, within the remote computing system 116 and/or within a service that is employed by the remote computing system 116. In still other implementations, the repository 618 may be distributed between the mobile device 104 and the remote computing system 116 and/or a service employed by the remote computing system 116.

In some implementations, the repository 618 may store account identifiers, e.g., email addresses, directly in association with biometric data, e.g., facial images, for respective individuals. In some embodiments, for example, the repository may correspond to an Active Directory for an organization and facial images or other biometric data may be stored in such a directory together with other user-specific data, such as user names, employee numbers, account identifiers, etc., for the various individuals in an organization. In such embodiments, the biometric recognition engine 610 may access the stored biometric data in the Active Directory for purposes of comparing it with the biometric data received from the biometric data acquisition engine 608. As such, the biometric recognition engine 610 may be able to determine, based on the biometric data received from the biometric data acquisition engine 608, the name(s) and/or other information identifying the individuals from whom the biometric data was obtained as well as the account identifiers, e.g., email addresses, for any such individuals.

In some embodiments, the repository 618 may comprise two or more separate repositories that store different types of data. For example, in some implementations, the biometric recognition engine 610 may include a first service that determines user names or other identifying information (e.g., employee numbers) that correspond to acquired biometric data and a second service that determines account identifiers, e.g., email addresses, that correspond to user names. In such an implementation, the first service may reference a first repository that stores biometric data (e.g., facial images) for respective users in association with user names/identifiers, and the second service may reference a second repository that stores user names/identifiers in association with account identifiers, e.g., email addresses.

As noted above, in some implementations, the biometric recognition engine 610 may employ or include a third party service or application that is capable of comparing biometric data samples. For example, in some implementations, the biometric recognition engine 610 may employ or include a third party service or application for recognizing and comparing faces in different images, or comparing a face in one image with faces in a collection of stored images. Examples of third party services/applications that may be used for such purposes include (1) Amazon Rekognition, which is described at the uniform resource locator (URL) "docs.aws.amazon.com" at the path "/rekognition," (2) Azure Face, which is describe at the URL "docs.microsoft.com" at the path "/en-us/azure/cognitive-services/face/," and (3) the Face Recognition API provided by Lamda Labs, as described at the URL "lambdalabs.com" at the path "/face-recognition-api."

At a step 906 of the routine 900, the biometric recognition engine 610 may provide information identifying the account custodians recognized using the acquired biometric data and their associated account identifiers, e.g., email addresses, and perhaps other information concerning the identified individuals, such as user names, employee numbers, etc., to the file/information access control engine 612. In some implementations, the biometric recognition engine 610 may also provide the file/information access control engine 612 with confidence values corresponding to the determined account identifiers. Each such confidence value may, for example, indicate the degree of confidence that the acquired biometric data matched stored biometric data associated with a particular account custodian.

In some embodiments, the file/information access control engine 612 may be responsible for determining the circumstances in which the user 102 is to be requested to confirm that information is to be shared with one or more specified account custodians and/or to allow the user to select one or more identified custodians with whom the information is to be shared. The file/information access control engine 612 may also be responsible for causing the information to be made accessible to accounts for such individuals, either immediately or upon receipt of such confirmation/selection by the user 102. In some implementations, the file/information access control engine 612 may operate, in whole or in part, on the mobile device 104. In other implementations, the file/information access control engine 612 may operate, in whole or in part, within the remote computing system 116 (shown in FIG. 1B). In still other implementations, the file/information access control engine 612 may be distributed between the mobile device 104 and the remote computing system 116.

Figure 10:
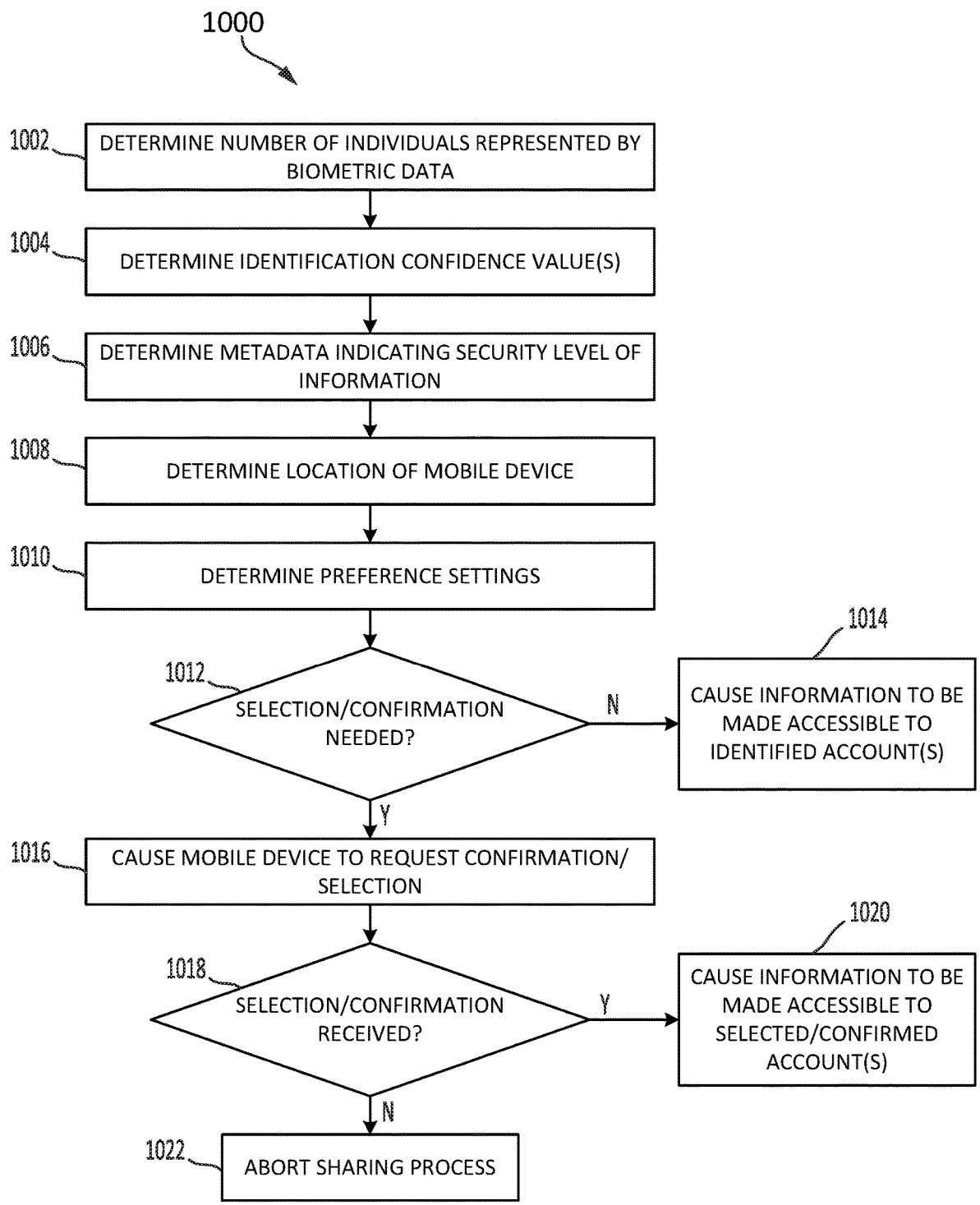
FIG. 10 is a flow chart illustrate an example routine that may be executed by the file/information access control engine shown in FIG. 6.

An example routine 1000 that may be executed by the file/information access control engine 612 is shown in FIG. 10. Steps 1002, 1004, 1006, 1008 and 1010 of the routine 1000 involve determining various type of data that may be considered in determining, at a decision step 1012, whether the mobile device 104 is to prompt the user 102 for input confirming that the selected information is to be shared with one or more account custodians who were identified by the biometric recognition engine 610 and/or selecting one or more identified custodians with whom the selected information is to be shared.

As shown at the step 1002, one factor that may be considered at the decision step 1012 is the number of individuals who were recognized using the biometric data. For example, an image acquired by a camera of the mobile device 104 may represent faces of multiple individuals. In some implementations, confirmation and/or recipient selection by the user 102 may be requested in at least some circumstances in which more than one individual is identified.

As shown at the step 1004, another factor that may be considered at the decision step 1012 is the identification confidence value(s) received from the biometric recognition engine 610. In some implementations, confirmation and/or recipient selection by the user 102 may additionally or alternatively be requested in at least some circumstances when one or more such confidence values fall below a threshold.

As shown at the step 1006, still another factor that may be considered at the decision step 1012 is metadata associated with the to-be-shared information that indicates its security level. For example, some files or other information may include metadata indicating such files/information contain "confidential" or "highly-confidential" information. In some implementations, confirmation and/or recipient selection by the user 102 may additionally or alternatively be requested in at least some circumstances depending on the indicated security level of the to-be-shared information.

As shown at the step 1008, yet another factor that may be considered at the decision step 1012 is a location of the mobile device 104 at the time the biometric data of the individual(s) 106 was acquired. In some implementations, for example, the mobile device 104 may acquire location data using a global positioning system (GPS) or other location determination mechanism and associate such information with the biometric data acquired by the biometric sensor(s) 616. In some implementations, confirmation and/or recipient selection by the user 102 may additionally or alternatively be requested depending on the indicated location. Such confirmation and/or recipient selection may be requested, for example, in at least some circumstances when the mobile device 104 is located remote from the user's ordinary workspace and/or is at a location that is known to be accessible to the general public.

As shown at the step 1010, still another factor that may be considered at the decision step 1012 is one or more preference settings associated with the user 102 and/or the mobile device 104. Such preference settings may, for example, indicate the circumstances and/or manner in which one or more of the other factors indicated above are taken into account when determining whether confirmation and/or recipient selection by the user 102 is to be requested.

When, at the decision step 1012, it is determined that confirmation and/or recipient selection by the user 102 is not to be requested, the routine 1000 may proceed to a step 1014 at which the file/information access control engine 612 may cause the selected information to be made accessible to the accounts corresponding the account identifiers determined by the biometric recognition engine 610 without receiving further input from the user 102. As discussed above in connection with the steps 114 and 126 of the routines 108 and 118 (shown in FIGS. 1A and 1B), the information may be made accessible to the specified accounts in any of a number of ways, such as by sending the information to repositories for the identified account(s) or interacting with a file sharing system or other repository to enable the information to be accessed using such account(s).

When, at the decision step 1012, it is determined that confirmation and/or recipient selection by the user 102 is to be requested, the routine 1000 may instead proceed to a step 1016 at which the file/information access control engine 612 may cause the mobile device 104 to prompt the user 102 to provide such a confirmation/selection. The routine 1000 may then await the requested confirmation/selection at a decision step 1018.

When, at the decision step 1018, the file/information access control engine 612 determines that the user 102 has provided the requested confirmation/selection via the mobile device 104, the routine 1000 may proceed to a step 1020 at which the file/information access control engine 612 may cause the selected information to be made accessible to the accounts/recipients that were confirmed and/or selected by the user 102, such as by using one or more of the above-described information sharing techniques.

When, at the decision step 1018, the file/information access control engine 612 determines that the user 102 has either denied the confirmation/selection request or else not provided a response within a threshold period of time, the routine 1000 may instead proceed to a step 1022 at which the information sharing process that was initiated by the file/information management engine 606 (at the step 704 of the routine 700) may be aborted.

G. Example Implementations of Methods, Systems, and Computer-Readable Media in Accordance with the Present Disclosure The following paragraphs (M1) through (M20) describe examples of methods that may be implemented in accordance with the present disclosure.

(M1) A method may involve the acts of receiving, by a device operated by a user, at least one first input indicating that information is to be shared with at least one individual other than the user; acquiring, with the device, first biometric data from the at least one individual; and causing the information to be made accessible to at least one account that is associated with stored biometric data that matches the first biometric data.

(M2) A method may involve the acts described in paragraph (M1), wherein acquiring the first biometric data comprises using a camera of the device to acquire an image of a face of the at least one individual.

(M3) A method may involve the acts described in paragraph (M1) or paragraph (M2), and may further involve the acts of sending, from the device to a remote computing system, the first biometric data; and receiving, by the device and from the remote computing system, response data identifying a custodian of the at least one account.

(M4) A method may involve the acts described in of paragraphs (M1) through (M3), and may further involve the acts of sending, from the device to a remote computing system, the first biometric data; and receiving, by the device and from the remote computing system, response data including an account identifier to be used to share the information with at least one account.

(M5) A method may involve the acts described in of paragraphs (M1) through (M4), and may further involve the acts of presenting, by the device, an identity of a custodian of the at least one account; presenting, by the device, a request for at least one second input indicating that the information is to be shared with the custodian; and receiving, by the device, the at least one second input.

(M6) A method may involve the acts described in paragraph (M5), and may further involve the acts of determining a confidence value indicating a likelihood that the first biometric data was acquired from the custodian; and determining to present the request for the at least one second input based at least in part on the confidence value.

(M7) A method may involve the acts described in paragraph (M5) or paragraph (M6), and may further involve the acts of determining that the first biometric data includes at least a first portion acquired from a first individual and a second portion acquired from a second individual; and determining to present the request for the at least one second input based at least in part on the first biometric data including the first and second portions.

(M8) A method may involve the acts described in of paragraphs (M5) through (M7), and may further involve the acts of determining metadata, associated with the information, that indicates a security level of the information; and determining to present the request for the at least one second input based at least in part on the metadata.

(M9) A method may involve the acts described in of paragraphs (M5) through (M8), and may further involve the acts of determining that the device is at a first location; and determining to present the request for the at least one second input based at least in part on the device being at the first location.

(M10) A method may involve the acts of receiving, at a computing system and from a remote device operated by a user, an indication that information is to be shared with at least one individual other than the user; receiving, at the computing system and from the remote device, first biometric data that was acquired from the at least one individual; determining, by the computing system, that the first biometric data matches stored biometric data that is associated with at least one account; and causing the information to be made accessible to the at least one account based at least in part on the first biometric data matching the stored biometric data.

(M11) A method may involve the acts described in paragraph (M10), wherein the first biometric data comprises an image of a face of the at least one individual.

(M12) A method may involve the acts described in paragraph (M10) or paragraph (M11), and may further involve the act of sending, from the computing system to the remote device, response data identifying a custodian of the at least one account.

(M13) A method may involve the acts described in any of paragraphs (M10) through (M12), and may further involve the act of sending, from the computing system to the remote device, response data including an account identifier to be used to share the information with at least one account.

(M14) A method may involve the acts described in any of paragraphs (M10) through (M13), and may further involve the acts of sending, from the computing system to the remote device, a first communication identifying a custodian of the at least one account; and receiving, at the computing system and from the remote device, a second communication indicating that the information is to be shared with the custodian.

(M15) A method may involve the acts of receiving an indication that information is to be shared with at least one individual; determining first biometric data that was acquired from the at least one individual; determining that the first biometric data matches stored biometric data that is associated with at least one account; and causing the information to be made accessible to the at least one account based at least in part on the first biometric data matching the stored biometric data.

(M16) A method may involve the acts described in paragraph (M15), wherein determining the first biometric data comprises using a camera to acquire an image representing at least a portion of the first biometric data.

(M17) A method may involve the acts described in paragraph (M15) or paragraph (M16), and may further involve the acts of acquiring, using at least one biometric sensor of a mobile device, the first biometric data; and sending, from the mobile device to a remote computing system, the first biometric data; wherein the remote computing system determines that the first biometric data matches the stored biometric data.

(M18) A method may involve the acts described in paragraph (M17), and may further involve the act of receiving, by the mobile device and from the remote computing system, response data identifying a custodian of the at least one account.

(M19) A method may involve the acts described in paragraph (M18), and may further involve the acts of presenting, by the mobile device, an identity of the custodian; presenting, by the mobile device, a request for at least one second input indicating that the information is to be shared with the custodian; and receiving, by the mobile device, the at least one second input.

(M20) A method may involve the acts described in any of paragraphs (M17) through (M19), and may further involve the act of receiving, by the mobile device and from the remote computing system, response data including an account identifier to be used to share the information with at least one account.

The following paragraphs (S1) through (S20) describe examples of systems and devices that may be implemented in accordance with the present disclosure.

(S1) A system may comprise at least one processor, and at least one computer-readable medium encoded with instructions which, when executed by the at least one processor, cause the system to receive, by a device operated by a user, at least one first input indicating that information is to be shared with at least one individual other than the user, to acquire, with the device, first biometric data from the at least one individual, and to cause the information to be made accessible to at least one account that is associated with stored biometric data that matches the first biometric data.

(S2) A system may be configured as described in paragraph (S1), and the at least one computer-readable medium may be encoded with additional instruction which, when executed by the at least one processor, further cause the system to acquire the first biometric data at least in part by using a camera of the device to acquire an image of a face of the at least one individual.

(S3) A system may be configured as described in paragraph (S1) or paragraph (S2), and the at least one computer-readable medium may be encoded with additional instruction which, when executed by the at least one processor, further cause the system to send, from the device to a remote computing system, the first biometric data; and receive, by the device and from the remote computing system, response data identifying a custodian of the at least one account.

(S4) A system may be configured as described in of paragraphs (S1) through (S3), and the at least one computer-readable medium may be encoded with additional instruction which, when executed by the at least one processor, further cause the system to send, from the device to a remote computing system, the first biometric data; and receive, by the device and from the remote computing system, response data including an account identifier to be used to share the information with at least one account.

(S5) A system may be configured as described in of paragraphs (S1) through (S4), and the at least one computer-readable medium may be encoded with additional instruction which, when executed by the at least one processor, further cause the system to present, by the device, an identity of a custodian of the at least one account; present, by the device, a request for at least one second input indicating that the information is to be shared with the custodian; and receive, by the device, the at least one second input.

(S6) A system may be configured as described in paragraph (S5), and the at least one computer-readable medium may be encoded with additional instruction which, when executed by the at least one processor, further cause the system to determine a confidence value indicating a likelihood that the first biometric data was acquired from the custodian; and determine to present the request for the at least one second input based at least in part on the confidence value.

(S7) A system may be configured as described in paragraph (S5) or paragraph (S6), and the at least one computer-readable medium may be encoded with additional instruction which, when executed by the at least one processor, further cause the system to determine that the first biometric data includes at least a first portion acquired from a first individual and a second portion acquired from a second individual; and determine to present the request for the at least one second input based at least in part on the first biometric data including the first and second portions.

(S8) A system may be configured as described in of paragraphs (S5) through (S7), and the at least one computer-readable medium may be encoded with additional instruction which, when executed by the at least one processor, further cause the system to determine metadata, associated with the information, that indicates a security level of the information; and determine to present the request for the at least one second input based at least in part on the metadata.

(S9) A system may be configured as described in of paragraphs (S5) through (S8), and the at least one computer-readable medium may be encoded with additional instruction which, when executed by the at least one processor, further cause the system to determine that the device is at a first location; and determine to present the request for the at least one second input based at least in part on the device being at the first location.

(S10) A system may comprise at least one processor, and at least one computer-readable medium encoded with instructions which, when executed by the at least one processor, cause the system to receive, at a computing system and from a remote device operated by a user, an indication that information is to be shared with at least one individual other than the user, to receive, at the computing system and from the remote device, first biometric data that was acquired from the at least one individual, to determine, by the computing system, that the first biometric data matches stored biometric data that is associated with at least one account, and to cause the information to be made accessible to the at least one account based at least in part on the first biometric data matching the stored biometric data.

(S11) A system may be configured as described in paragraph (S10), wherein the first biometric data comprises an image of a face of the at least one individual.

(S12) A system may be configured as described in paragraph (S10) or paragraph (S11), and the at least one computer-readable medium may be encoded with additional instruction which, when executed by the at least one processor, further cause the system to send, from the computing system to the remote device, response data identifying a custodian of the at least one account.

(S13) A system may be configured as described in any of paragraphs (S10) through (S12), and the at least one computer-readable medium may be encoded with additional instruction which, when executed by the at least one processor, further cause the system to send, from the computing system to the remote device, response data including an account identifier to be used to share the information with at least one account.

(S14) A system may be configured as described in any of paragraphs (S10) through (S13), and the at least one computer-readable medium may be encoded with additional instruction which, when executed by the at least one processor, further cause the system to send, from the computing system to the remote device, a first communication identifying a custodian of the at least one account, and to receive, at the computing system and from the remote device, a second communication indicating that the information is to be shared with the custodian.

(S15) A system may comprise at least one processor, and at least one computer-readable medium encoded with instructions which, when executed by the at least one processor, cause the system to receive an indication that information is to be shared with at least one individual, to determine first biometric data that was acquired from the at least one individual, to determine that the first biometric data matches stored biometric data that is associated with at least one account, and to cause the information to be made accessible to the at least one account based at least in part on the first biometric data matching the stored biometric data.

(S16) A system may be configured as described in paragraph (S15), and the at least one computer-readable medium may be encoded with additional instruction which, when executed by the at least one processor, further cause the system to determine the first biometric data at least in part by using a camera to acquire an image representing at least a portion of the first biometric data.

(S17) A system may be configured as described in paragraph (S15) or paragraph (S16), and the at least one computer-readable medium may be encoded with additional instruction which, when executed by the at least one processor, further cause the system to acquire, using at least one biometric sensor of a mobile device, the first biometric data, and to send, from the mobile device to a remote computing system, the first biometric data; wherein the remote computing system determines that the first biometric data matches the stored biometric data.

(S18) A system may be configured as described in paragraph (S17), and the at least one computer-readable medium may be encoded with additional instruction which, when executed by the at least one processor, further cause the system to receive, by the mobile device and from the remote computing system, response data identifying a custodian of the at least one account.

(S19) A system may be configured as described in paragraph (S18), and the at least one computer-readable medium may be encoded with additional instruction which, when executed by the at least one processor, further cause the system to present, by the mobile device, an identity of the custodian, to present, by the mobile device, a request for at least one second input indicating that the information is to be shared with the custodian, and to receive, by the mobile device, the at least one second input.

(S20) A system may be configured as described in any of paragraphs (S17) through (S19), and the at least one computer-readable medium may be encoded with additional instruction which, when executed by the at least one processor, further cause the system to receive, by the mobile device and from the remote computing system, response data including an account identifier to be used to share the information with at least one account.

The following paragraphs (CRM1) through (CRM20) describe examples of computer-readable media that may be configured in accordance with the present disclosure.

(CRM1) At least one non-transitory computer-readable medium may be encoded with instructions which, when executed by at least one processor of a system, cause the system to receive, by a device operated by a user, at least one first input indicating that information is to be shared with at least one individual other than the user, to acquire, with the device, first biometric data from the at least one individual, and to cause the information to be made accessible to at least one account that is associated with stored biometric data that matches the first biometric data.

(CRM2) At least one computer-readable medium may be configured as described in paragraph (CRM1), and may be encoded with additional instruction which, when executed by the at least one processor, further cause the system to acquire the first biometric data at least in part by using a camera of the device to acquire an image of a face of the at least one individual.

(CRM3) At least one computer-readable medium may be configured as described in paragraph (CRM1) or paragraph (CRM2), and may be encoded with additional instruction which, when executed by the at least one processor, further cause the system to send, from the device to a remote computing system, the first biometric data; and receive, by the device and from the remote computing system, response data identifying a custodian of the at least one account.

(CRM4) At least one computer-readable medium may be configured as described in of paragraphs (CRM1) through (CRM3), and may be encoded with additional instruction which, when executed by the at least one processor, further cause the system to send, from the device to a remote computing system, the first biometric data; and receive, by the device and from the remote computing system, response data including an account identifier to be used to share the information with at least one account.

(CRM5) At least one computer-readable medium may be configured as described in of paragraphs (CRM1) through (CRM4), and may be encoded with additional instruction which, when executed by the at least one processor, further cause the system to present, by the device, an identity of a custodian of the at least one account; present, by the device, a request for at least one second input indicating that the information is to be shared with the custodian; and receive, by the device, the at least one second input.

(CRM6) At least one computer-readable medium may be configured as described in paragraph (CRM5), and may be encoded with additional instruction which, when executed by the at least one processor, further cause the system to determine a confidence value indicating a likelihood that the first biometric data was acquired from the custodian; and determine to present the request for the at least one second input based at least in part on the confidence value.

(CRM7) At least one computer-readable medium may be configured as described in paragraph (CRM5) or paragraph (CRM6), and may be encoded with additional instruction which, when executed by the at least one processor, further cause the system to determine that the first biometric data includes at least a first portion acquired from a first individual and a second portion acquired from a second individual; and determine to present the request for the at least one second input based at least in part on the first biometric data including the first and second portions.

(CRM8) At least one computer-readable medium may be configured as described in of paragraphs (CRM5) through (CRM7), and may be encoded with additional instruction which, when executed by the at least one processor, further cause the system to determine metadata, associated with the information, that indicates a security level of the information; and determine to present the request for the at least one second input based at least in part on the metadata.

(CRM9) At least one computer-readable medium may be configured as described in of paragraphs (CRM5) through (CRM8), and may be encoded with additional instruction which, when executed by the at least one processor, further cause the system to determine that the device is at a first location; and determine to present the request for the at least one second input based at least in part on the device being at the first location.

(CRM10) At least one non-transitory computer-readable medium may be encoded with instructions which, when executed by at least one processor of a system, cause the system to receive, at a computing system and from a remote device operated by a user, an indication that information is to be shared with at least one individual other than the user, to receive, at the computing system and from the remote device, first biometric data that was acquired from the at least one individual, to determine, by the computing system, that the first biometric data matches stored biometric data that is associated with at least one account, and to cause the information to be made accessible to the at least one account based at least in part on the first biometric data matching the stored biometric data.

(CRM11) At least one computer-readable medium may be configured as described in paragraph (CRM10), wherein the first biometric data comprises an image of a face of the at least one individual.

(CRM12) At least one computer-readable medium may be configured as described in paragraph (CRM10) or paragraph (CRM11), and may be encoded with additional instruction which, when executed by the at least one processor, further cause the system to send, from the computing system to the remote device, response data identifying a custodian of the at least one account.

(CRM13) At least one computer-readable medium may be configured as described in any of paragraphs (CRM10) through (CRM12), and may be encoded with additional instruction which, when executed by the at least one processor, further cause the system to send, from the computing system to the remote device, response data including an account identifier to be used to share the information with at least one account.

(CRM14) At least one computer-readable medium may be configured as described in any of paragraphs (CRM10) through (CRM13), and may be encoded with additional instruction which, when executed by the at least one processor, further cause the system to send, from the computing system to the remote device, a first communication identifying a custodian of the at least one account, and to receive, at the computing system and from the remote device, a second communication indicating that the information is to be shared with the custodian.

(CRM15) At least one non-transitory computer-readable medium may be encoded with instructions which, when executed by at least one processor of a system, cause the system to receive an indication that information is to be shared with at least one individual, to determine first biometric data that was acquired from the at least one individual, to determine that the first biometric data matches stored biometric data that is associated with at least one account, and to cause the information to be made accessible to the at least one account based at least in part on the first biometric data matching the stored biometric data.

(CRM16) At least one computer-readable medium may be configured as described in paragraph (CRM15), and may be encoded with additional instruction which, when executed by the at least one processor, further cause the system to determine the first biometric data at least in part by using a camera to acquire an image representing at least a portion of the first biometric data.

(CRM17) At least one computer-readable medium may be configured as described in paragraph (CRM15) or paragraph (CRM16), and may be encoded with additional instruction which, when executed by the at least one processor, further cause the system to acquire, using at least one biometric sensor of a mobile device, the first biometric data, and to send, from the mobile device to a remote computing system, the first biometric data; wherein the remote computing system determines that the first biometric data matches the stored biometric data.

(CRM18) At least one computer-readable medium may be configured as described in paragraph (CRM17), and may be encoded with additional instruction which, when executed by the at least one processor, further cause the system to receive, by the mobile device and from the remote computing system, response data identifying a custodian of the at least one account.

(CRM19) At least one computer-readable medium may be configured as described in paragraph (CRM18), and may be encoded with additional instruction which, when executed by the at least one processor, further cause the system to present, by the mobile device, an identity of the custodian, to present, by the mobile device, a request for at least one second input indicating that the information is to be shared with the custodian, and to receive, by the mobile device, the at least one second input.

(CRM20) At least one computer-readable medium may be configured as described in any of paragraphs (CRM17) through (CRM19), and may be encoded with additional instruction which, when executed by the at least one processor, further cause the system to receive, by the mobile device and from the remote computing system, response data including an account identifier to be used to share the information with at least one account.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:
1. A method, comprising:
receiving, by a device operated by a user, at least one first input indicating that information is to be shared with at least one individual other than the user;

acquiring, with the device, first biometric data from the at least one individual;

using the first biometric data to determine at least a first account identifier that is associated with stored biometric data that matches the first biometric data; and causing the information to be made accessible to at least one account corresponding to the first account identifier determined using the first biometric data.

2. The method of claim 1, wherein acquiring the first biometric data comprises using a camera of the device to acquire an image of a face of the at least one individual.

3. The method of claim 1, further comprising:
sending, from the device to a remote computing system, the first biometric data;
in response to sending the first biometric data to the remote computing system, receiving, by the device and from the remote computing system, response data identifying a custodian of the at least one account; and
using, by the device, the response data to determine the first account identifier.

4. The method of claim 1, further comprising:
sending, from the device to a remote computing system, the first biometric data; and
in response to sending the first biometric data to the remote computing system, receiving, by the device and from the remote computing system, response data including the first account identifier.

5. The method of claim 1, further comprising:
after using the first biometric data to determine the first account identifier, presenting, by the device, an identity of a custodian of the at least one account;
presenting, by the device, a request for at least one second input indicating that the information is to be shared with the custodian; and
receiving, by the device, the at least one second input.

6. The method of claim 5, further comprising:
determining a confidence value indicating a likelihood that the first biometric data was acquired from the custodian; and
determining to present the request for the at least one second input based at least in part on the confidence value.

7. The method of claim 5, further comprising:
determining that the first biometric data includes at least a first portion acquired from a first individual and a second portion acquired from a second individual; and
determining to present the request for the at least one second input based at least in part on the first biometric data including the first portion and the second portion.

8. The method of claim 5, further comprising:
determining metadata, associated with the information, that indicates a security level of the information; and
determining to present the request for the at least one second input based at least in part on the metadata.

9. The method of claim 5, further comprising:
determining that the device is at a first location; and
determining to present the request for the at least one second input based at least in part on the device being at the first location.

10. A method, comprising:
receiving, at a computing system and from a remote device operated by a user, an indication that information is to be shared with at least one individual other than the user;
receiving, at the computing system and from the remote device, first biometric data that was acquired from the at least one individual;
using the first biometric data received from the remote device to determine at least a first account identifier that is associated with stored biometric data that matches the first biometric data; and
causing the information to be made accessible to at least one account corresponding to the first account identifier determined using the first biometric data.

11. The method of claim 10, wherein the first biometric data comprises an image of a face of the at least one individual.

12. The method of claim 10, further comprising:
after using the first biometric data to determine the first account identifier, sending, from the computing system to the remote device, response data identifying a custodian of the at least one account.

13. The method of claim 10, further comprising:
after using the first biometric data to determine the first account identifier, sending, from the computing system to the remote device, response data including the first account identifier that is to be used to share the information with at least one account.

14. The method of claim 10, further comprising:
after using the first biometric data to determine the first account identifier, sending, from the computing system to the remote device, a first communication identifying a custodian of the at least one account; and
receiving, at the computing system and from the remote device, a second communication indicating that the information is to be shared with the custodian.

15. A system, comprising:
at least one processor; and
at least one non-transitory computer-readable medium encoded with instructions which, when executed by the at least one processor, cause the system to:
receive an indication that information is to be shared with at least one individual,
determine first biometric data that was acquired from the at least one individual,
use the first biometric data to determine at least a first account identifier that is associated with stored biometric data that matches the first biometric data, and
cause the information to be made accessible to at least one account corresponding to the first account identifier determined using the first biometric data.

16. The system of claim 15, further comprising:
a camera configured to acquire an image representing at least a portion of the first biometric data.

17. The system of claim 15, wherein the system comprises a mobile device including at least one biometric sensor and a remote computing system, and the at least one non-transitory computer-readable medium is further encoded with additional instruction which, when executed by the at least one processor, further cause the system to:
acquire, using the at least one biometric sensor, the first biometric data; and
send, from the mobile device to the remote computing system, the first biometric data;
wherein the remote computing system determines that the first biometric data matches the stored biometric data.

18. The system of claim 17, wherein the at least one non-transitory computer-readable medium is further encoded with additional instruction which, when executed by the at least one processor, further cause the system to:
in response to sending the first biometric data to the remote computing system, receive, by the mobile device and from the remote computing system, response data identifying a custodian of the at least one account; and use, by the mobile device, the response data to determine the first account identifier.

19. The system of claim 17, wherein the at least one non-transitory computer-readable medium is further encoded with additional instruction which, when executed by the at least one processor, further cause the system to:

after using the first biometric data to determine the first account identifier, present, by the mobile device, an identity of a custodian of the at least one account;

present, by the mobile device, a request for at least one second input indicating that the information is to be shared with the custodian; and receive, by the mobile device, the at least one second input.

20. The system of claim 17, wherein the at least one non-transitory computer-readable medium is further encoded with additional instruction which, when executed by the at least one processor, further cause the system to:

receive, by the mobile device and from the remote computing system, response data including the first account identifier that is to be used to share the information with at least one account.

* * * * *